United States Patent
Hatatani et al.

(10) Patent No.: US 7,129,487 B2
(45) Date of Patent: Oct. 31, 2006

(54) INFRARED DETECTING CIRCUIT AND AN INFRARED DETECTOR

(75) Inventors: Teruki Hatatani, Sanda (JP); Suguru Fukui, Shijonawate (JP); Yuji Takada, Kyoto (JP)

(73) Assignee: Matsushita Electric Works, Ltd., Osaka (JP)

( * ) Notice: Subject to any disclaimer, the term of this patent is extended or adjusted under 35 U.S.C. 154(b) by 251 days.

(21) Appl. No.: 10/486,836

(22) PCT Filed: Nov. 27, 2002

(86) PCT No.: PCT/JP02/12352

§ 371 (c)(1),
(2), (4) Date: Apr. 8, 2004

(87) PCT Pub. No.: WO03/047002

PCT Pub. Date: Jun. 5, 2003

(65) Prior Publication Data

US 2004/0149910 A1    Aug. 5, 2004

(30) Foreign Application Priority Data

Nov. 27, 2001    (JP)    ............................. 2001-361653

(51) Int. Cl.
*G01J 5/00*    (2006.01)
(52) U.S. Cl. .................................. 250/338.3
(58) Field of Classification Search ............... 250/338.3
See application file for complete search history.

(56) References Cited

U.S. PATENT DOCUMENTS 5,949,072 A * 9/1999 Takada et al. ............ 250/338.3

6,313,462 B1    11/2001   Matsuda et al.

FOREIGN PATENT DOCUMENTS

| EP | 0341691 | 11/1989 |
|----|---------|---------|
| EP | 0867700 | 9/1998 |
| EP | 0902536 | 3/1999 |
| GB | 2206202 | 12/1988 |
| JP | 3-269390 | 11/1991 |
| JP | 07035872 A * | 2/1995 |
| JP | 2001099707 A * | 4/2001 |

OTHER PUBLICATIONS

Schouten, "A New Amplifier Design for Fast Low-Noise Far-Infrared Detectors Using a Pyroelectric Element", published on Apr. 1, 1998, in Bristol, GB by Measurement Science and Technology, IOP Publishing, pp. 686-691.

Lacanette, "A Basic Introduction to Filters—Active, Passive, and Switched-Capacitor" (Application Note 779), published on Apr. 1, 1991, in the U.S.A. by National Semiconductor Corporation, pp. 1-22.

English language Abstract of JP 3-269390.

* cited by examiner

*Primary Examiner*—Constantine Hannaher
(74) *Attorney, Agent, or Firm*—Greenblum & Bernstein, P.L.C.

(57) ABSTRACT

An infrared detecting circuit is provided with a current-to-voltage converting circuit including a capacitor connected with an inverting input terminal and an output terminal of an operational amplifier and a resistance circuit element connected in parallel with the capacitor, an inverting amplifying circuit connected with an output side of the current-to-voltage converting circuit, a band-pass filter circuit connected with an output side of the voltage amplifying circuit, and an output circuit connected with an output side of the band-pass filter circuit. The infrared detecting circuit and an infrared detector including this circuit can be miniaturized.

19 Claims, 15 Drawing Sheets

US 7,129,487 B2

INFRARED DETECTING CIRCUIT AND AN INFRARED DETECTOR

TECHNICAL FIELD

This invention relates to an infrared detecting circuit and an infrared detector.

BACKGROUND ART

An infrared detector of the prior art is, as shown in FIG. 15, provided with a pyroelectric element 100 for detecting infrared rays radiated from a human body, a current-to-voltage converting circuit 200 for converting a detection current signal of the pyroelectric element 100 into a voltage signal, a coupling capacitor C30 connected with the current-to-voltage converting circuit 200, a voltage amplifying circuit 300 connected with an output of the coupling capacitor C30, a low-pass filter 400 connected with the voltage amplifying circuit 300, a high-pass filter 500 connected with the low-pass filter 400, an amplifying circuit 600 connected with the high-pass filter 500, and an output circuit 700 connected with the amplifying circuit 600.

The current-to-voltage converting circuit 200 includes a FET (Field Effect Transistor) having a gate connected with the pyroelectric element 100, a resistor Rg connected in parallel with the opposite ends of the pyroelectric element 100, and a resistor Rs provided between a source of the FET and a ground. The low-pass filter 400 and the high-pass filter 500 each include a switched capacitor.

The infrared detector thus constructed operates as follows. A detection current signal outputted from the pyroelectric element 100 is converted into a voltage signal by the resistor Rg and applied to the gate of the FET, whereby a drain current flows from the source of the FET to a drain thereof. A source voltage is generated between the FET and the resistor Rs by the flow of the drain current. After direct-current (dc) components of the source voltage is cut by the coupling capacitor C30, and the source voltage is amplified at an amplification factor (1+R20/R10) by the voltage amplifying circuit 300, and is consequently handled as a voltage signal in a specified frequency band whose high-frequency components and low-frequency components have been cut by the low-pass filter 400 and the high-pass filter 500. This voltage signal is amplified at a set gain by the amplifying circuit 600, and is outputted as a detection signal from the output circuit 700 after being compared with a specified level therein.

However, the above coupling capacitor C30 needs to have a large capacity in order to pass frequency components around 1 Hz expressing the motion of the human body, etc. Thus, a large-size capacitor has to be used as such. The large-size capacitor is obliged to be separately externally provided since it is difficult to integrate. Such an externally provided coupling capacitor C30 has been standing as a large hindrance to miniaturization or integration of the infrared detector.

DISCLOSURE OF THE INVENTION

It is an object of the present invention to provide an infrared detecting circuit and device which are free from the problems residing in the prior art.

According to an aspect of the present invention, an infrared detecting circuit is constructed by a current-to-voltage converting circuit, an amplifying circuit for amplifying the voltage signal outputted from the current-to-voltage converting circuit, a band-pass filter circuit including a switched capacitor and adapted to pass components of a voltage signal from the amplifying circuit in a specified frequency band, a clock generating circuit for generating a reference clock signal for controlling the switched capacitor, and an output circuit for outputting a voltage signal outputted from the band-pass filter circuit as a detection signal when the voltage signal is at a threshold level or higher.

The current-to-voltage converting circuit is to be connected with a pyroelectric element operable to generate a current signal in accordance with a received infrared ray to thereby convert the current signal outputted from the pyroelectric element into a voltage signal. The current-to-voltage converting circuit includes an operational amplifier connected with the pyroelectric element, a capacitor, and a feedback circuit for feeding back a direct current component. The capacitor and the feedback circuit are connected between an output terminal and an inverting input terminal of the operational amplifier in parallel with each other.

A pyroelectric element is connected with the current-to-voltage converting circuit of the above-mentioned infrared detecting circuit to produce an infrared detector.

These and other objects, features and advantages of the present invention will become more apparent upon a reading of the following detailed description and accompanying drawings.

BEST MODE FOR CARRYING OUT THE INVENTION

Figure 1:
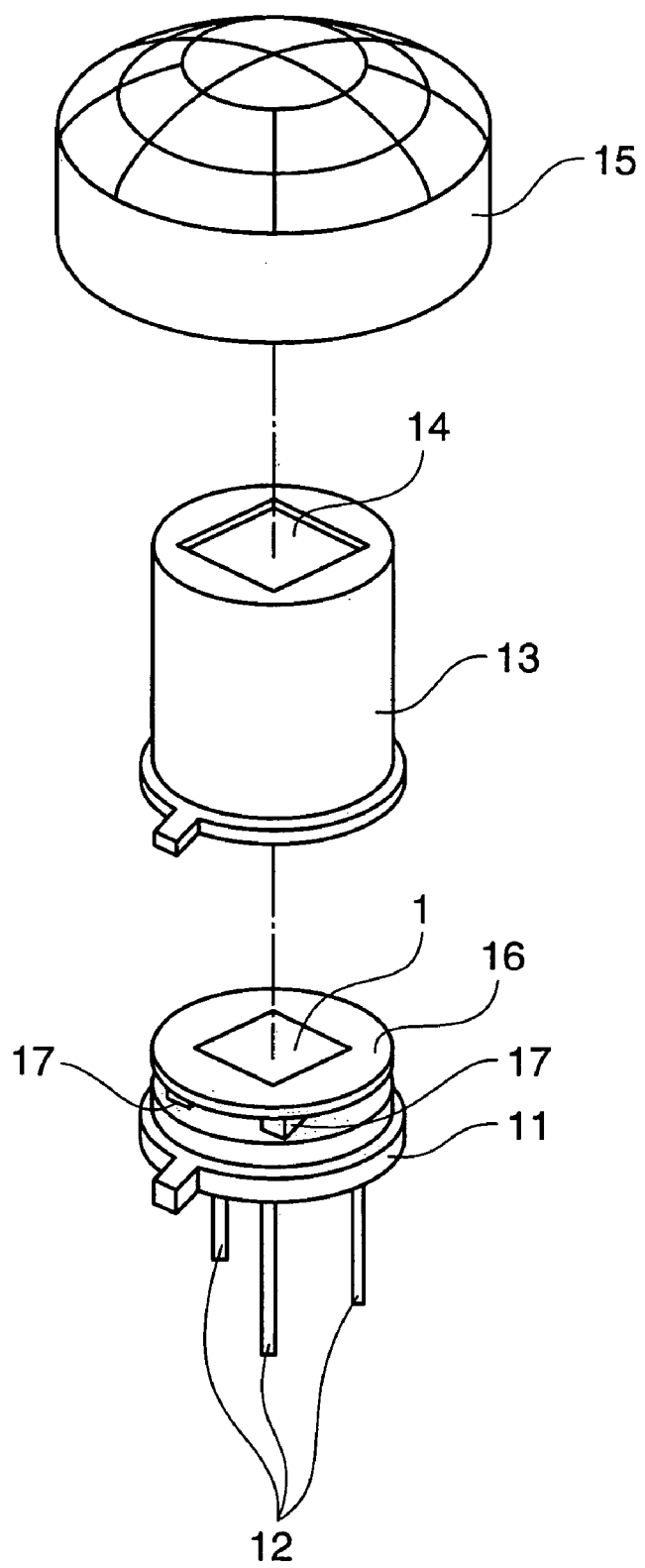
FIG. 1 is an exploded perspective view of an infrared detector according to an embodiment of the present invention.

Referring to FIG. 1 explodedly showing a construction of an infrared detector according to an embodiment of the present invention, the infrared detector comprises a disk-shaped base 11 having three lead wires 12 connected with the bottom surface thereof, a disk-shaped printed circuit board 16 mounted on the upper surface of the base 11 via two furrings 17, a pyroelectric element 1 mounted substantially in the middle of the printed circuit board 16 and having a rectangular light detecting surface, a bottomed hollow cylindrical can 13 having an optical filter window 14 in its ceiling wall and adapted to cover the printed circuit board 16, and a dome-shaped large-diameter condenser lens 15 mounted on the ceiling wall of the can 13. The condenser lens 15 is a multi-lens including a number of lens.

Infrared rays radiated from a human body and passed through the lens 15 and the optical filter window 14 are incident on the pyroelectric element 1. An infrared detecting circuit for processing a detection current signal is mounted on the rear surface of the printed circuit board 16. The infrared detecting circuit is integrated into one piece.

Figure 2:
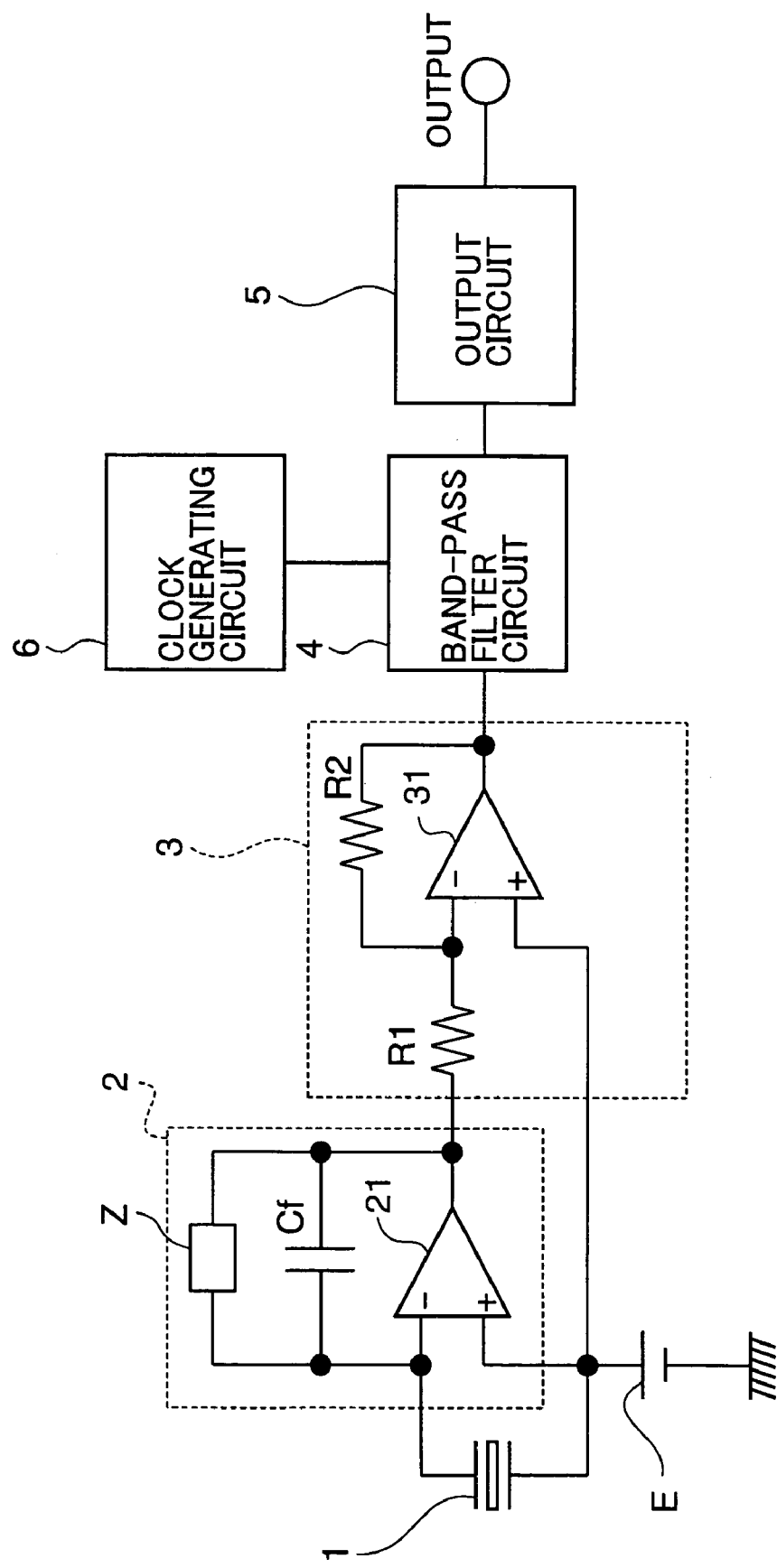
FIG. 2 is a circuit diagram of an infrared detecting circuit used in the infrared detector.

A detailed construction of the infrared detecting circuit is shown in FIG. 2. This infrared detecting circuit is provided with a current-to-voltage converting circuit 2 for converting a current signal from the pyroelectric element 1 into a voltage signal, a voltage amplifying circuit 3 connected with an output of the current-to-voltage converting circuit 2, a band-pass filter circuit 4 connected with an output of the voltage amplifying circuit 3, and an output circuit 5 connected with an output of the band-pass filter circuit 4.

The pyroelectric element 1 generates polarization charges corresponding to a temperature increase when temperature increases due to radiated heat waves, and outputs these polarization charges as a detection current signal.

The current-to-voltage converting circuit 2 includes an operational amplifier 21 having an inverting input terminal connected with one end of the pyroelectric element 1, a feedback capacitor Cf connected between an output terminal and the inverting input terminal of the operational amplifier 21, and a resistance circuit element Z connected in parallel with the feedback capacitor Cf. A power supply E for outputting a reference voltage Vr used to set an operating point of the voltage signal to be outputted is connected between the non-inverting input terminal of the operational amplifier 21 and a ground. Since the current-to-voltage converting circuit 2 includes the operational amplifier 21 and gives a negative feedback via the resistance circuit element Z, the variation of the operating point is suppressed. This eliminates the need for a coupling capacitor conventionally used to cut the variation of the operating point, consequently making it possible to reduce the size of the infrared detecting circuit greatly.

The current-to-voltage converting circuit 2 is provided with the feedback capacitor Cf. The current components in the frequency band of around 0.1 to 1.0 Hz of the current outputted from the pyroelectric element 1 that is important to detect a human body is converted into the voltage signal by the use of the feedback capacitor Cf. In the conventional current-to-voltage converting circuit which converts a current signal from a pyroelectric element into a voltage signal by use of a resistance member, there is the problem that the converted voltage signal contains a considerable number of noises due to the fact that the resistance member is likely to generate thermal noises. On the other, a capacitor is theoretically seen not to generate thermal noises. Accordingly, it will be apparent that the current-to-voltage converting circuit 2 of this embodiment using the capacitor Cf can convert a current signal from a pyroelectric element into a voltage signal having few noise.

The voltage amplifying circuit 3 is in the form of an inverting amplifying circuit, and includes an operational amplifier 31 having an inverting input terminal connected with an output terminal of the current-to-voltage converting circuit 2 via a resistor R1, and a resistor R2 provided between an output terminal and the inverting input terminal of the operational amplifier 31. Further, the power supply E for outputting the reference voltage Vr used to set the operating point of the voltage signal to be outputted is connected with a non-inverting input terminal of the operational amplifier 31.

Since the operational amplifier 21 has a very low output impedance, it is not necessary to consider the input impedance of a circuit connected with the output terminal of the operational amplifier 21. Accordingly, the inverting amplifying circuit 3 having a low input impedance is connected with the output terminal of the operational amplifier 21 to thereby amplify the voltage.

An inverting amplifying circuit is used as the voltage amplifying circuit 3 in this embodiment. If a non-inverting amplifying circuit is, conversely, used, the power supply needs to be connected between a gain resistor connected with the inverting input terminal of the operational amplifier 31 and the ground. If the power supply is connected in this way, a current flows thereinto and the power supply becomes unstable due to a voltage decrease caused by the internal resistance therein. Thus, a power supply needs to be connected separately from the power supply E connected with the pyroelectric element 1 and the current-to-voltage converting circuit 2. On the other hand, if the voltage amplifying circuit 3 is constructed by the inverting amplifying circuit as in this embodiment, the power supply E can be directly connected with the non-inverting input terminal of the operational amplifier 31. Further, since the non-inverting input terminal has a high input impedance, no current flows into the power supply E and no voltage decrease occurs due to the internal resistance in the power supply E. Thus, the reference voltage of the inverting amplifying circuit can be stabilized. Therefore, the power supply E can be commonly used for the current-to-voltage converting circuit 2 and the voltage amplifying circuit 3, and the detecting circuit can be accordingly made smaller. Furthermore, the common use of the power supply E permits the reference voltage for the current-to-voltage converting circuit 2 and the reference voltage for the voltage amplifying circuit 3 to be identical with each other, consequently making the respective operating points of the both circuits 2 and 3 identical with each other. Accordingly, the operating point can be regulated to a negligible variation even without providing a coupling capacitor between the both circuits 2 and 3.

The band-pass filter circuit 4 is provided with a switched capacitor filter to miniaturize the infrared detecting circuit, and gives a specified gain to a voltage signal in the frequency band of 0.1 to 1.0 Hz, which is important in detecting a human body, and then outputs the voltage signal. The switched capacitor filter has a resistor section. The resistor section is constructed by a switched capacitor including a capacitor and a switching element such as a MOSFET connected with a clock generating circuit 6. The switching element is turned on and off by a reference clock signal from the clock generating circuit 6 to charge and discharge the capacitor, whereby causing the capacitor to equivalently function as a resistance member. An equivalent resistance value R by the switched capacitor is expressed by R=1/f·C wherein f and C denote a frequency (sampling frequency) of the clock signal given to the switching element and the capacity of the capacitor, respectively.

In the band-pass filter circuit 4 provided with the above-mentioned switched capacitor filter, there is a likelihood that a return noise occurs when an inputted voltage signal contains many high-frequency components. However, in this embodiment, the current-to-voltage converting circuit 2 performs the current-to-voltage conversion by the capacitor Cf. The impedance of the capacitor Cf is expressed by $1/(2\pi \cdot f \cdot Cf)$. The impedance of the capacitor Cf becomes smaller as the frequency becomes higher. Accordingly, the voltage signal is outputted from the current-to-voltage converting circuit 2 after the high-frequency components are greatly cut. In other words, the voltage signal having negligible high-frequency components is input to the band-pass filter circuit 4. The return noise in the band-pass filter circuit 4 can be suppressed.

The output circuit 5 includes a comparator to compare the voltage signal outputted from the band-pass filter circuit 4 with a specified threshold level, and outputs a detection signal when the voltage signal is at the threshold level or higher.

This infrared detector operates as follows. A detection current signal outputted from the pyroelectric element 1 is inputted to the current-to-voltage converting circuit 2. The voltage signal of the detection current signal that is in the frequency band of 0.1 to 1.0 Hz, which is important in detecting a human body, is converted into a voltage signal by the impedance component $1/(2\pi \cdot f \cdot Cf)$ of the capacitor Cf. In this way, the high-frequency components are cut and the S/N ratio is improved. Subsequently, after being amplified at an amplification factor of R2/R1 in the voltage amplifying circuit 3, the voltage signal converted by the current-to-voltage converting circuit 2 has components in the frequency band of 0.1 to 1.0 Hz cut off by the band-pass filter circuit 4. Since the high-frequency components are cut in the current-to-voltage converting circuit 2, the occurrence of return noise in the band-pass filter circuit 4 is suppressed. Subsequently, the resulting voltage signal is compared with the threshold level in the output circuit 5, which then outputs a detection signal.

As described above, according to the infrared detecting circuit, the coupling capacitor having been used in the conventional infrared detecting circuit can be omitted and the power supply E connected with pyroelectric element 1, the current-to-voltage converting circuit 2 and the voltage amplifying circuit 3 can be commonly used. Thus, the infrared detecting circuit can be made smaller. Further, since the high-frequency components are cut by the current-to-voltage converting circuit 2, the occurrence of return noise in the band-pass filter circuit 4 can be suppressed.

Figure 3:
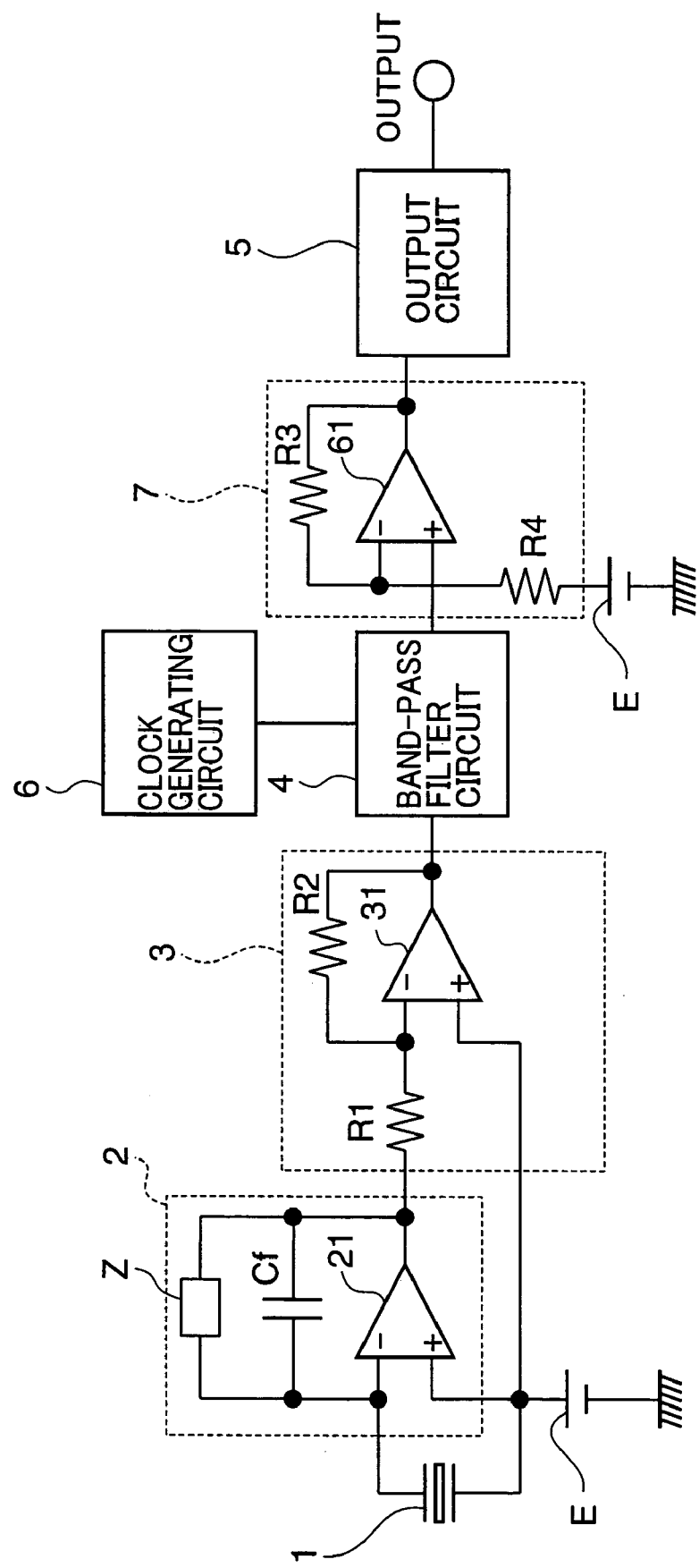
FIG. 3 is a circuit diagram of a first modified infrared detecting circuit used in the infrared detector.

FIG. 3 is a circuit diagram of a first modified infrared detecting circuit used in the infrared detector. This infrared detecting circuit is identical to the infrared detecting circuit shown in FIG. 2 except for that a second amplifying circuit 7 is additionally provided between a band-pass filter circuit 4 and an output circuit 5. The second amplifying circuit 7 is a non-inverting amplifying circuit, and includes an operational amplifier 61 having a non-inverting input terminal connected with an output terminal of the band-pass filter circuit 4, a resistor R3 connected between an output terminal and an inverting input terminal of the operational amplifier 61 and a resistor R4 connected with the inverting input terminal of the operational amplifier 61. A power supply E for setting the operating point at a specified level is connected between the resistor R4 and the ground.

A signal component in the frequency band of 0.1 to 1.0 Hz is important in detecting human bodies and living organisms. For this reason, the frequency performance characteristic of a band-pass filter circuit 4 arranged prior to the second amplifying circuit 7 is set at a peak frequency of around 1.0 Hz. Consequently, a signal component in the frequency of around 0.1 Hz is attenuated by the band-pass filter circuit 4. Accordingly, the threshold level of the output circuit 5 has to be set lower so as to detect the attenuated signal component in the frequency of around 0.1 Hz conform to the attenuated voltage signal, which inevitably makes the influence of noise and the like no negligible and leads to a higher possibility of an erroneous detection. If it is assumed that a voltage signal in the frequency band around 0.1 Hz is attenuated, for example, by about 20 dB by the band-pass filter circuit 4 (the amplitude of the outputted signal becomes ⅟₁₀ with respect to the inputted signal), the amplitude of the voltage signal outputted from the voltage amplifying circuit 3 has to be 10 times the threshold level in order to cause the output circuit 5 to precisely compare the voltage signal and the threshold level and output the detection signal. In order to secure an output voltage having an amplitude which is 10 times the threshold level, a supply voltage level of the operational amplifier 31 needs to be at least 10 times the threshold level. The supply voltage level is normally about 15 V although it depends on the characteristics of the operational amplifier 31 used and, accordingly, there is a specific limit in increasing the supply voltage level of the operational amplifier 31. On the other hand, it may be considered to maintain the supply voltage level of the operational amplifier 31 low by reducing the threshold level of the output circuit 5. However, if the threshold level is reduced, the output circuit 5 may output the detection signal even in response to a noise signal having a small amplitude and, accordingly, there is also a specific limit in reducing the threshold level. Thus, the threshold level is normally set at about half the supply voltage level of the operational amplifier 31. However, in such a case, the output circuit 5 cannot output the detection signal if the amplitude of the voltage signal in the frequency band of around 0.1 Hz is attenuated to ½ or lower by the band-pass filter circuit 4.

Accordingly, in the current-to-voltage converting circuit of this modification, the amplifying circuit 7 is connected between the band-pass filter circuit 4 and the output circuit 5 to solve the above problem by amplifying the amplitude level of the voltage signal attenuated in the band-pass filter circuit 4 substantially to the threshold level.

As described above, according to the first modified infrared detecting circuit, an erroneous detection by the output circuit 5 is prevented by connecting the amplifying circuit 7 between the band-pass filter circuit 4 and the output circuit 5 to amplify the attenuated amplitude of the voltage signal outputted from the band-pass filter circuit 4 substantially to the threshold level. Accordingly, the detection accuracy of this circuit is considerably increased.

Figure 4:
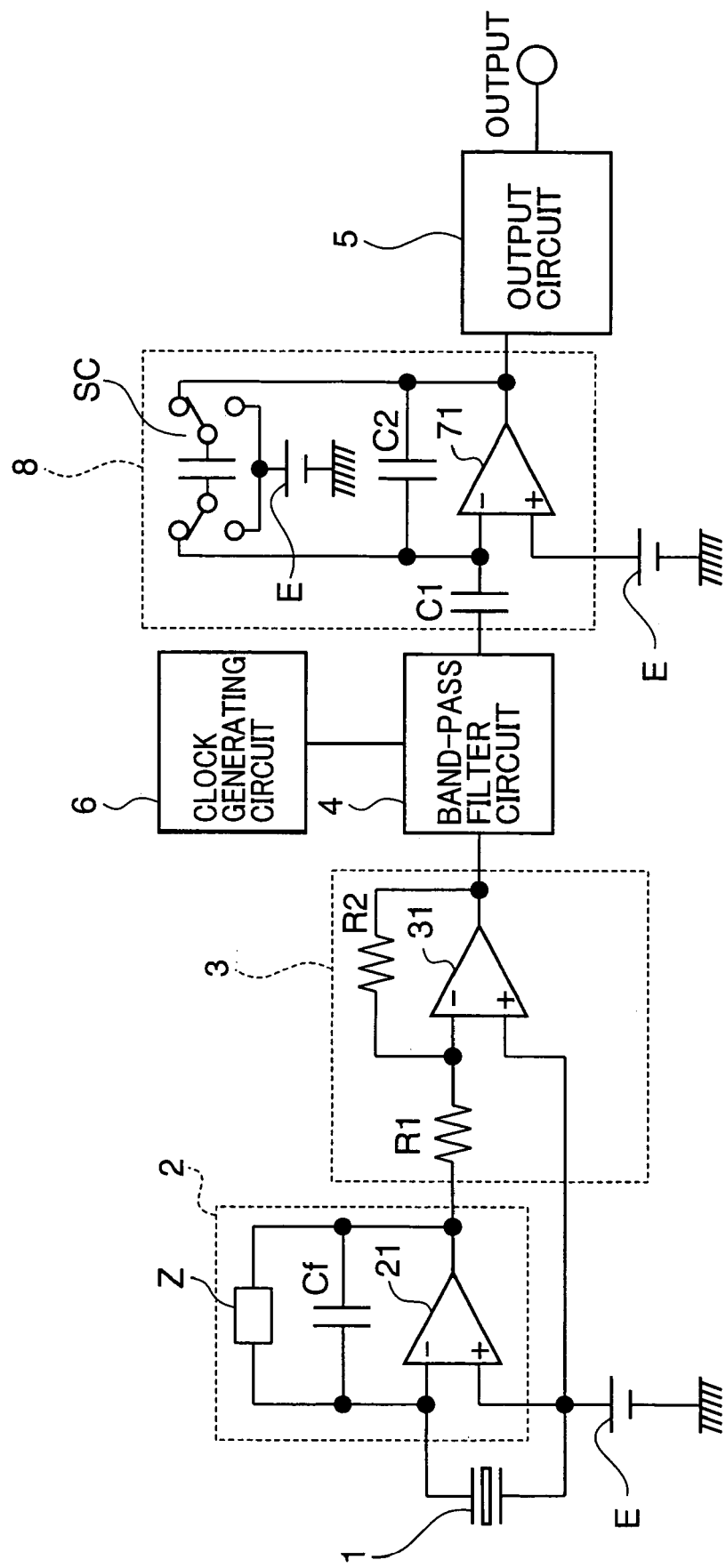
FIG. 4 is a circuit diagram of a second modified infrared detecting circuit used in the infrared detector.

FIG. 4 is a circuit diagram of a second modified infrared detecting circuit. The second modified infrared detecting circuit is identical to the infrared detecting circuit shown in FIG. 2 except for that a high-pass filter 8 is provided between a band-pass filter circuit 4 and an output circuit 5. The high-pass filter 8 includes an operational amplifier 71 having a non-inverting input terminal connected with an output of the band-pass filter circuit 4 via a capacitor C1, a capacitor C2 connected between an output terminal and an inverting input terminal of the operational amplifier 71, and a switched capacitor SC connected in parallel with the capacitor C2. The switched capacitor SC is adopted for the miniaturization of the circuit as described above. A power supply E is connected with both a non-inverting input terminal of the operational amplifier 71 and the switched capacitor SC. Since a gain in a passage band of the high-pass filter 8 is expressed by a capacity ratio C1/C2, a desired gain can be obtained by suitably setting the capacities of the capacitors C1 and C2.

The effectiveness of the provision of the amplifying circuit 7 between the band-pass filter circuit 4 and the output circuit 5 is described in the first modification. If the amplification factor (gain) of the amplifying circuit 7 is set larger, there is a possibility of largely varying the operating point of the outputted voltage signal because the offset component of the voltage signal outputted from the band-pass filter circuit 4 is amplified at the larger amplification factor.

Accordingly, the variation of the operating point is suppressed by connecting the high-pass filter 8 having a gain between the band-pass filter circuit 4 and the output circuit 5 to cut low-frequency components of the voltage signal outputted from the band-pass filter circuit 4. Since the voltage signal of frequency components of 0.1 to 1.0 Hz is outputted after being amplified to a level approximate to the threshold level, an erroneous detection by the output circuit 5 can be prevented. Accordingly, the detection accuracy of the detecting circuit is remarkably increased.

As described above, according to the second modified infrared detecting circuit, an erroneous detection by the output circuit 5 can be prevented since the variation of the operating point of the voltage signal outputted from the high-pass filter 8 is suppressed and the frequency components of 0.1 to 1.0 Hz are outputted after being amplified to the level approximate to the threshold level. Accordingly, the detection accuracy of the detecting circuit is remarkably increased. Further, since the switched capacitor SC is used as a resistor section of the high-pass filter 8, the detecting circuit can be miniaturized and the temperature characteristic thereof can be stabilized.

Figure 5:
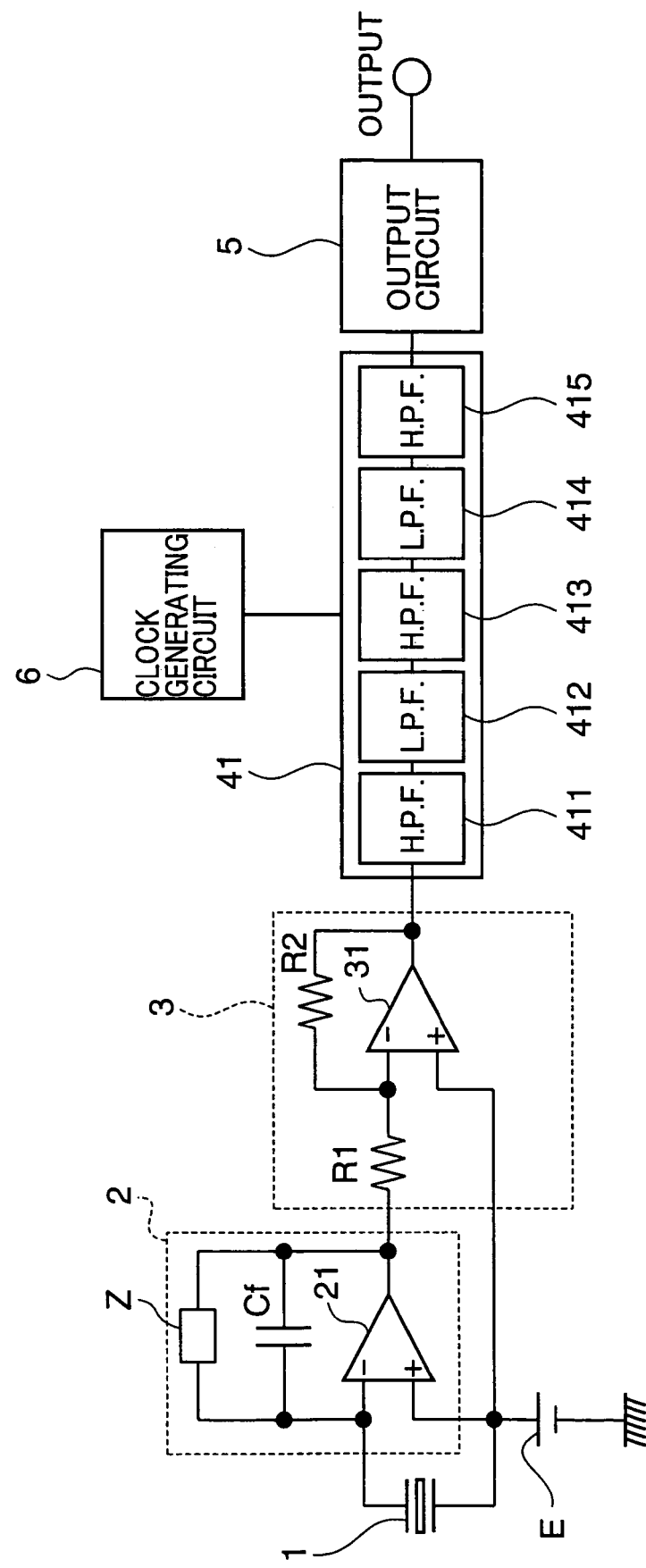
FIG. 5 is a circuit diagram of a third modified infrared detecting circuit used in the infrared detector.

FIG. 5 is a circuit diagram of a third modified infrared detecting circuit. The third modified infrared detecting circuit is identical to the infrared detecting circuit except for that there is provided a band-pass filter circuit 41 constructed by alternately connecting high-pass filters and low-pass filters at one stage after another. The high-pass filters and low-pass filters are both constructed by switched capacitors. More specifically, a total of five filters of high-pass filter (HPF) 411, low-pass filter (LPF) 412, high-pass filter (HPF) 413, low-pass filter (LPF) 414 and high-pass filter (HPF) 415 are successively connected from an output of a voltage amplifying circuit 3.

These filters not only serves as a band-pass filter circuit for extracting the signal components necessary to detect a human body, but also have the following functions. The high-pass filter 411 at the first stage suppresses the variation of an operating point by cutting low-frequency components contained in a voltage signal outputted from the voltage amplifying circuit 3. The low-pass filter 412 at the second stage outputs a voltage signal in the frequency band of 1 Hz or lower while giving a specified gain thereto.

The high-pass filters 413, 415 at the third and fifth stages suppress the variation of an operating point by cutting low-frequency components of the voltage signals outputted from the low-pass filters 412, 414 at the second and fourth stages. The capacity of a capacitor used in a switched capacitor needs to be reduced in order to increase a resistance value of a resistor forming the band-pass filter circuit 4 and integrate this circuit 41. If the capacity of the capacitor is reduced, feedthrough noise occurring during a switching operation by a pulse signal noticeably increases. The increase in the feedthrough noise in turn increases offset components of an operational amplifier, causing the operating points of the voltage signals outputted from the low-pass filters 412, 414 to largely vary. For this reason, the variations of the operating points are suppressed by cutting the low-frequency components by the high-pass filters 413, 415 connected at the third and fifth stages.

If the band-pass filter circuit 41 is constructed by a single low-pass filter which is then given a large gain (i.e., the band-pass filter circuit 41 is constructed by the high-pass filter 411, the low-pass filter 412 and high-pass filter 413), there is a possibility that direct current components are largely amplified and the voltage signal outputted from the low-pass filter 412 is saturated. Accordingly, in the band-pass filter circuit 41, the gain is distributed between the respective low-pass filters 412 and 414 to prevent the saturation of the voltage signals outputted from the low-pass filters 412, 414, and the variations of the operating points caused by the low-pass filters 412, 414 at the second and fourth stages are securely cut by the high-pass filters 413, 415 at the third and fifth stages to remarkably suppress the variation of the operating point. Further, if the gain is distributed between the respective low-pass filters 412 and 414, the switched capacitors of the low-pass filters 412, 414 can be constructed by low-capacity capacitors, enabling the miniaturization of the infrared detecting circuit.

As described above, according to the third modified infrared detecting circuit wherein two low-pass filters 412, 414 are provided to distribute the gain between the respective low-pass filters 412 and 414, it can be accomplished to prevent the saturation of the voltage signals outputted from the low-pass filters 412, 414, and give the high gain to the outputted voltage signal. Accordingly, the voltage signal outputted from the band-pass filter circuit 41 can be sent to the output circuit 5 without the necessity of amplifying the voltage signal. In other words, an amplifying circuit need not to be provided, which leads to the miniaturization of the infrared detecting circuit. Further, since the low-pass filter 412 (414) is arranged between the high-pass filters 411, 413, 415, the variation of the operating point resulting from the feedthrough noise can be assuredly suppressed.

Figure 6:
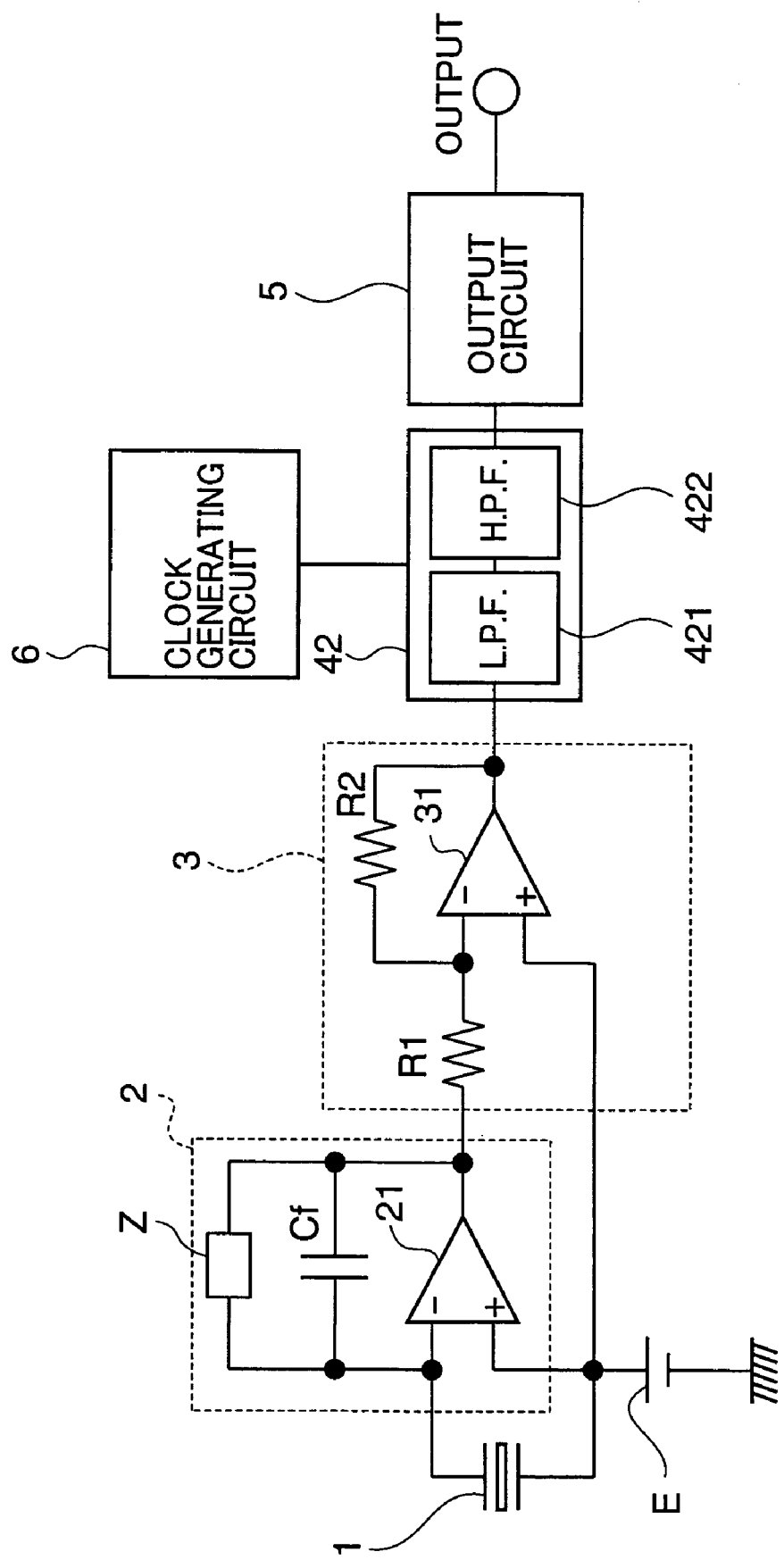
FIG. 6 is a circuit diagram of a fourth modified infrared detecting circuit used in the infrared detector.

FIG. 6 is a circuit diagram of a fourth modified infrared detecting circuit. The fourth modified infrared detecting circuit is identical to the infrared detecting circuit shown in FIG. 2 except for that there is provided a band-pass filter circuit 42 constructed by connecting a low-pass filter 421 at the first stage and a high-pass filter 422 at the second stage. As described in connection with the infrared detecting circuit shown in FIG. 2, the current-to-voltage converting circuit 2 performs the current-to-voltage conversion using the capacitor Cf to decrease the return noise from occurring in the band-pass filter circuit 4. However, it is difficult to completely suppress the occurrence of the return noise only by applying such a conversion. Accordingly, in the fourth modification, the low-pass filter 421 is provided at the first stage of the band-pass filter circuit 42 to introduce a voltage signal to the high-pass filter 422 after cutting high-frequency components of the voltage signal, whereby the occurrence of the return noise resulting from the switched capacitor is suppressed. Further, the variation of the operating point is suppressed since being cut by the high-pass filter 422 connected at the second stage. Accordingly, the fourth modified infrared detecting circuit can suppress the occurrence of return noise more securely.

Figure 7:
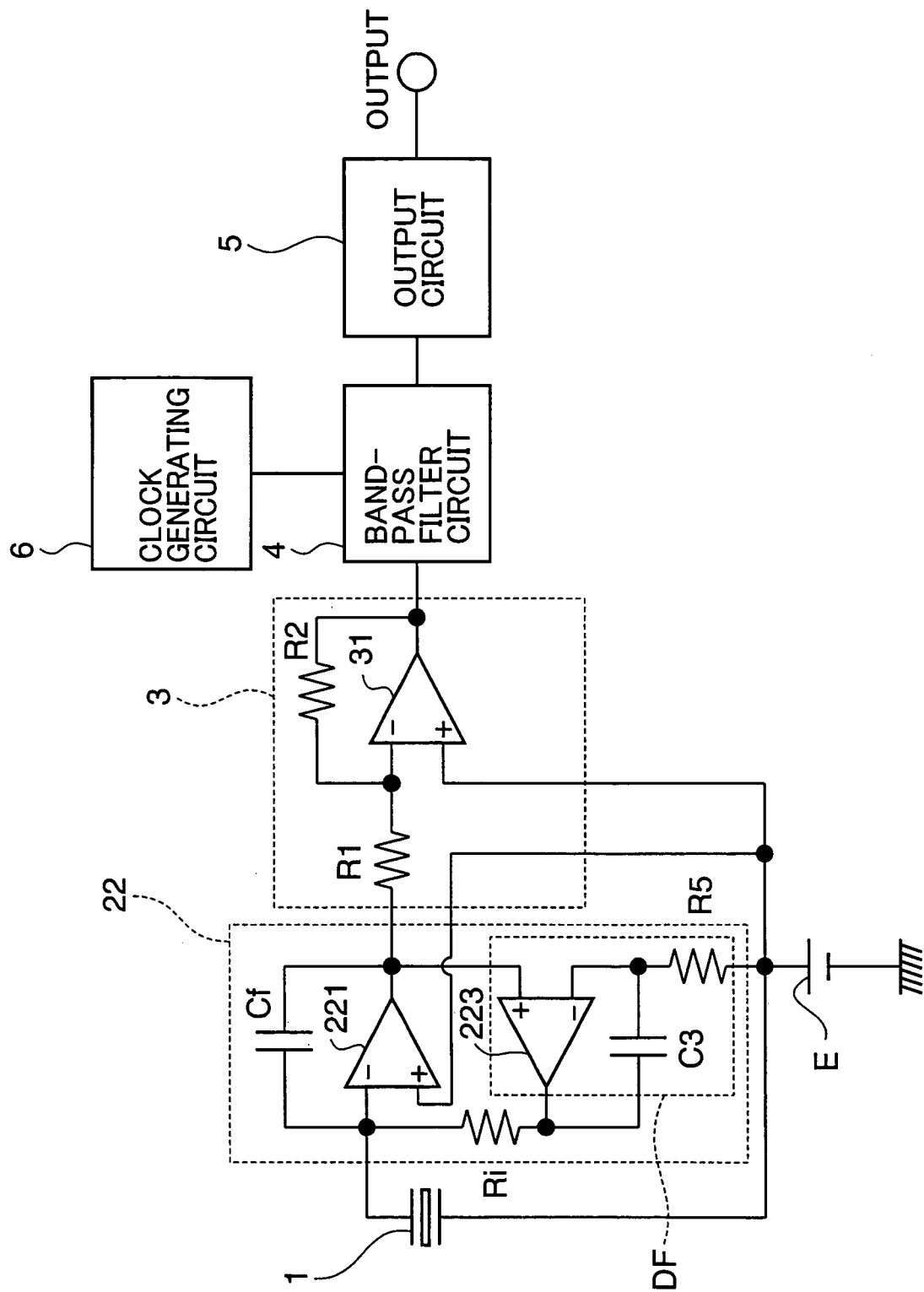
FIG. 7 is a circuit diagram of a fifth modified infrared detecting circuit used in the infrared detector.

FIG. 7 is a circuit diagram of a fifth modified infrared detecting circuit. The fifth modified infrared detecting circuit is identical to the infrared detecting circuit shown in FIG. 2 except for that there is provided a current-to-voltage converting circuit 22. Specifically, the current-to-voltage converting circuit 22 is constructed by connecting a resistor Ri and a direct current feedback circuit DF in parallel with an operational amplifier 221 having an inverting input terminal thereof connected with a pyroelectric element 1, and with a capacitor Cf connected between an output terminal and an inverting input terminal of the operational amplifier 221. The direct current feedback circuit DF is an integrating circuit, and includes an operational amplifier 223 having a non-inverting input terminal thereof connected with the output terminal of the operational amplifier 221, a capacitor C3 connected between the non-inverting input terminal and an output terminal of the operational amplifier 223, and a resistor R5 connected with the capacitor C3. Further, a power supply E for setting the operating point at a specified level is connected between the resistor R5 and a ground. In the current-to-voltage converting circuit 22, the output from the operational amplifier 221 is fed back by the use of the direct current feedback circuit DF. Accordingly, the alternating current components is fed back while being attenuated. The operating point of the outputted voltage signal can be more stabilized. Thus, the operating point can be stabilized even without the use of a coupling capacitor.

Figure 8:
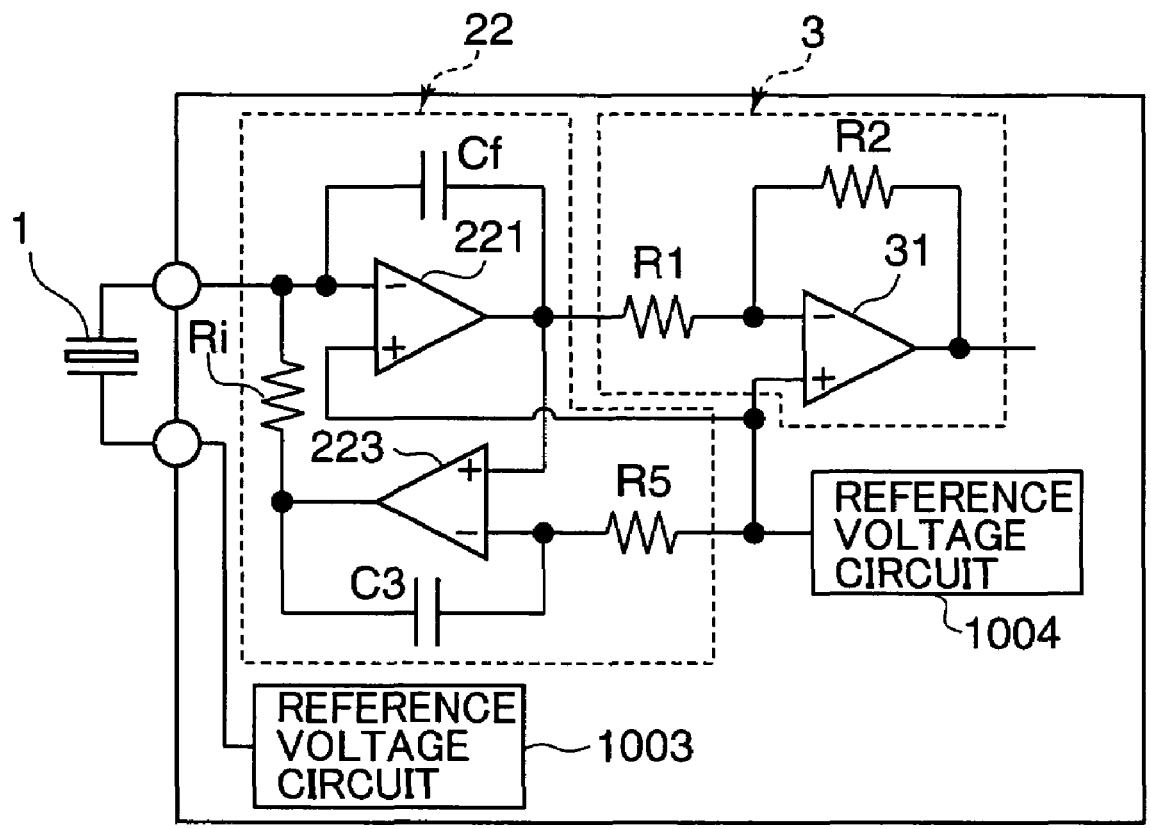
FIG. 8 is a circuit diagram of a main portion of a sixth modified infrared detecting circuit used in the infrared detector, showing a current-to-voltage converting circuit and a voltage amplifying circuit.

As described above, the fifth modified infrared detecting circuit, in which the direct current feedback circuit is connected with the current-to-voltage converting circuit 22, can reduce the variation of the operating point of the outputted voltage signal, enabling a stable current-to-voltage conversion. FIG. 8 is a circuit diagram of a part of a sixth modified infrared detecting circuit. The sixth modified infrared detecting circuit is identical to the fifth modification except for the of two reference voltage circuits 1003 and 1004. In the sixth modified infrared detecting circuit, the two reference voltage circuits 1003 and 1004 are used to apply a reference voltage for setting the operating points of the pyroelectric element 1, a current-to-voltage converting circuit 22 and a voltage amplifying circuit 3. The reference voltage circuit 1003 is connected with one end of the pyroelectric element 1, whereas the reference voltage circuit 1004 is connected with a non-inverting input terminal of an operational amplifier 221 and a non-inverting input terminal of an operational amplifier 31.

Since the pyroelectric element 1 is externally mounted on the infrared detecting circuit formed into an integrated circuit, noise may enter through a contact between the pyroelectric element 1 and the current-to-voltage converting circuit 2. If only one reference voltage circuit is provided for applying the reference voltage to the pyroelectric element 1, the current-to-voltage converting circuit 2 and the voltage amplifying circuit 3, the operations of the current-to-voltage converting circuit 2 and the voltage amplifying circuit 3 become unstable due to the influence of noise entered through the contact. Thus, the separate reference voltage circuits are provided for applying the reference voltage to the pyroelectric element 1 and for applying it to the current-to-voltage converting circuit 22 and the voltage amplifying circuit 3 in the sixth modification.

However, this construction may have the following problems. If Vn1, Vn2 denote a noise voltage normally outputted from the reference voltage circuit 1003 and a noise voltage normally outputted from the reference voltage circuit 1004, respectively, a value of contribution of the noise voltages Vn1, Vn2 to a voltage signal outputted from the operational amplifier 31 is expressed by the following Equation (1):

$$Vn1\{(Cs+Cf)/Cf\}\times(-R2/R1)+Vn1\times(R1+R2)/R1+Vn2\times(-Cs/Cf)\times(-R2/R1)=Vn1-(R2/R1)\times(Cs/Cf)\times(Vn1-Vn2) \quad (1)$$

wherein Cs denotes a capacitance component of the pyroelectric element. R2/R1 is a fairly large number since the voltage amplifying circuit 3 has a gain of several tens. Further, if the capacitance component Cs is sufficiently large, the noise voltages are amplified.

On the other hand, if a common reference voltage circuit is used as the reference voltage circuits 1003 and 1004, the second term of the Equation (1) is eliminated and only Vn1 remains at the right side of the Equation (1) since Vn1=Vn2. In this aspect, accordingly, it will be seen that the fifth modification where the reference voltage circuit for applying the reference voltage to the pyroelectric element 1, the current-to-voltage converting circuit 22 and the voltage amplifying circuit 3 is constructed by one circuit, that is, the power supply E, the contribution of the noise voltage of the power supply E to the voltage signal outputted from the voltage amplifying circuit 3 can be more suppressed regardless of the gain of the voltage amplifying circuit 3 and the capacitance component of the pyroelectric element 1. Further, there is not provided a coupling capacitor in the infrared detecting circuit. Accordingly, all the parts, i.e., from the current-to-voltage converting circuit 2 to the output circuit 5, can be integrated into a single chip, and the influence of external noises is suppressed. Even if the reference voltage circuit is constructed by a single power supply E, the external noises is reduced.

Figure 9:
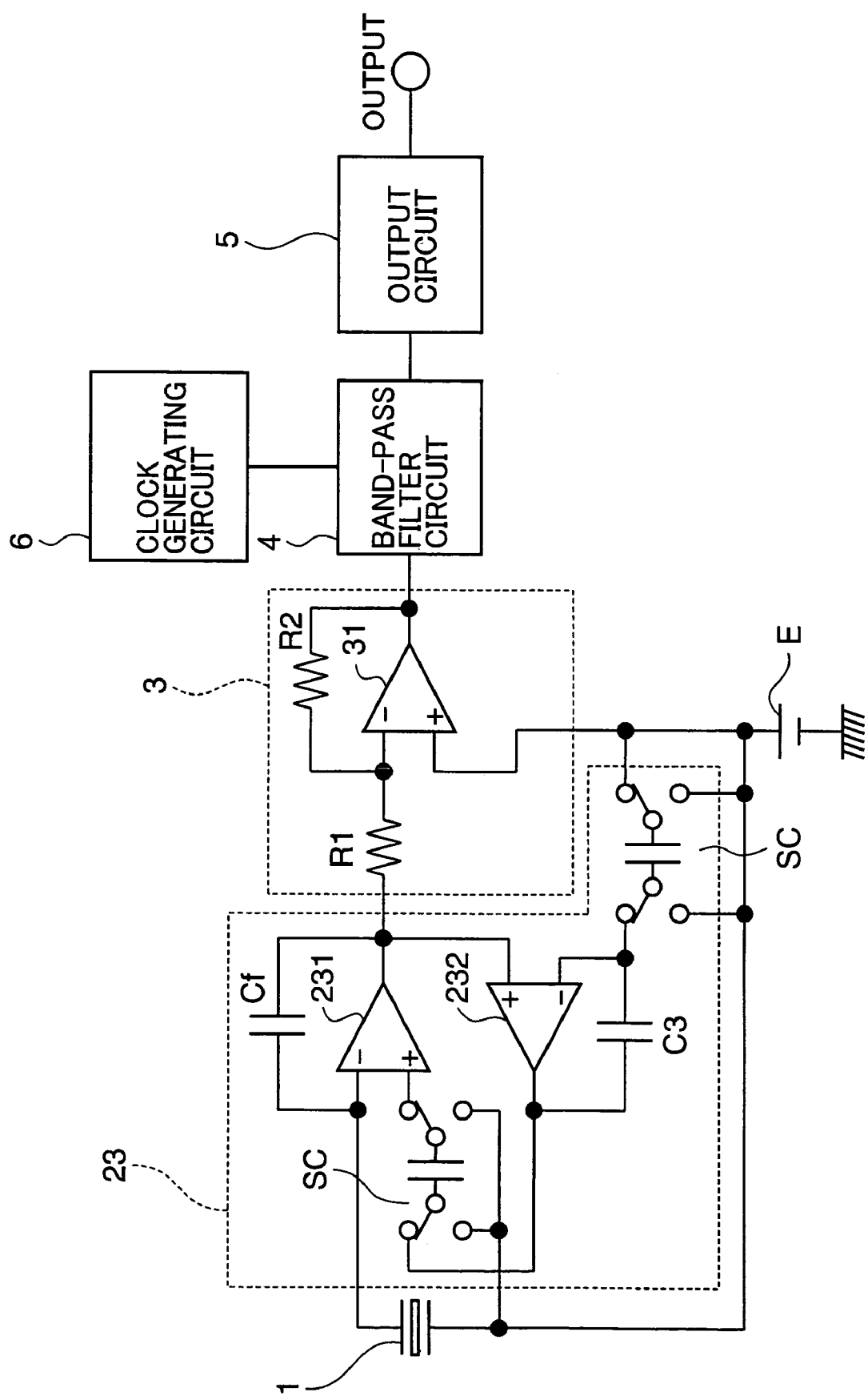
FIG. 9 is a circuit diagram of a seventh modified infrared detecting circuit used in the infrared detector.

FIG. 9 is a circuit diagram of a seventh modified infrared detecting circuit. The seventh modified infrared detecting circuit is identical to the sixth modification except for that resistors Ri and R5 are constructed by switched capacitors SC in a current-to-voltage converting circuit 22. Frequency components of around 0.1 to 1.0 Hz are important in detecting human bodies and living organisms, and the resistors Ri and R5 of the current-to-voltage converting circuit have to be constructed by high resistance members in order to deal with such low-frequency signals. Since the high resistance member has a large temperature characteristic, the resistance value thereof is caused to largely vary even by a slight temperature change, thereby hindering a stable current-to-voltage conversion.

Accordingly, in the seventh modified infrared detecting circuit, the above problem is solved by using the switched capacitors SC having a good temperature characteristic despite their high resistance value as the resistors Ri, R5 of the current-to-voltage converting circuit 23.

As described above, in the seventh modification, a stable current-to-voltage conversion is possible since the switched capacitors SC having a good temperature characteristic despite their high resistance value are used as the resistance members of the current-to-voltage converting circuit 23.

Figure 10:
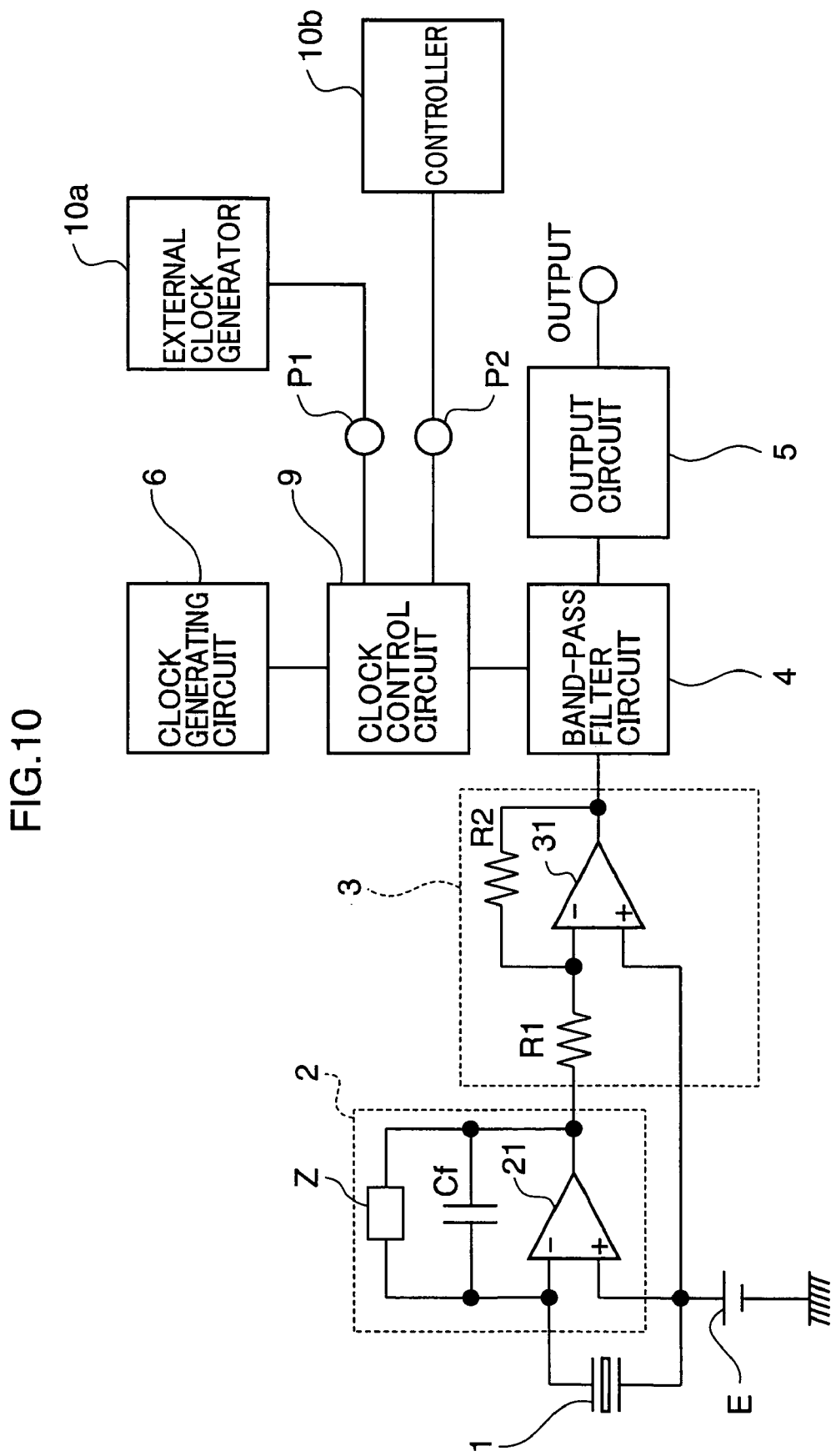
FIG. 10 is a circuit diagram of an eighth modified infrared detecting circuit used in the infrared detector.

FIG. 10 is a circuit diagram of a eighth modified infrared detecting circuit. The eighth modified infrared detecting circuit is identical to the infrared detecting circuit shown in FIG. 2 except for that a clock control circuit 9 is provided between a clock generating circuit 6 and a band-pass filter circuit 4, an external clock generator 10a is connected with the clock control circuit 9 via an external input terminal P1, and a controller 10b is connected with the clock control circuit 9 via a clock switching terminal P2.

The clock control circuit 9 selectively switches and outputs a reference clock signal from the clock generating circuit 6 and a clock signal from the external clock generator 10*a* to the band-pass filter circuit 4 in accordance with a clock switching signal inputted from the controller 10*b*.

The clock generating circuit 6 generates a reference clock signal having a frequency during a normal operation of the infrared detecting circuit and feeds it to switching elements of the switched capacitors in the infrared detecting circuit. The external clock generator 10*a* generates a clock signal to be fed to the switching elements of the switched capacitors, for example, during a test before shipment. The frequency of this clock signal is set to be, for example, 100 times that of the clock signal generated in the clock generating circuit 6.

This is because the frequency of the reference clock signal generated by the clock generating circuit 6 is so set as to determine an equivalent resistance value R of the switched capacitors to have a frequency characteristic around 1 Hz since frequency components of around 1 Hz are important in detecting human bodies, and the switched capacitors are operated using this clock signal. In other words, since the frequency characteristic of the infrared detecting circuit is set to be around 1 Hz, at shortest 1 second is required to test such a characteristic, causing a longer time to be required for the test before shipment.

On the other hand, by operating the switched capacitors using the clock signal having the 100-fold frequency and generated in the external clock generator 10*a*, the frequency character of the switched capacitors is shifted to around 100 Hz. Thus, the time required to test the characteristic can be shortened to 1/100 sec.

Next, the operation of this modification is described. When a clock switching signal is outputted from the controller 10*b*, the clock control circuit 9 switches connection to the external clock generator 10*a* to feed a clock signal of the external clock generator 10*a* to the band-pass filter circuit 4, thereby causing the switched capacitors to operate in accordance with the external clock signal. When a next switching signal is outputted from the controller 10*b*, the clock control circuit 9 switches connection to the clock generating circuit 6 to feed a reference clock signal of the clock generating circuit 6 to the band-pass filter circuit 4, thereby causing the switched capacitors to operate in accordance with the reference clock signal generated in the clock generating circuit 6, i.e., the clock signal used during the normal operation.

As described above, in the eighth modification, the clock control circuit 9 is provided and the switched capacitors is caused to operate in accordance with the high-frequency clock signal generated in the external clock generator 10*a* during the test before shipment. Therefore, the time required to test the characteristics can be shortened.

Figure 11:
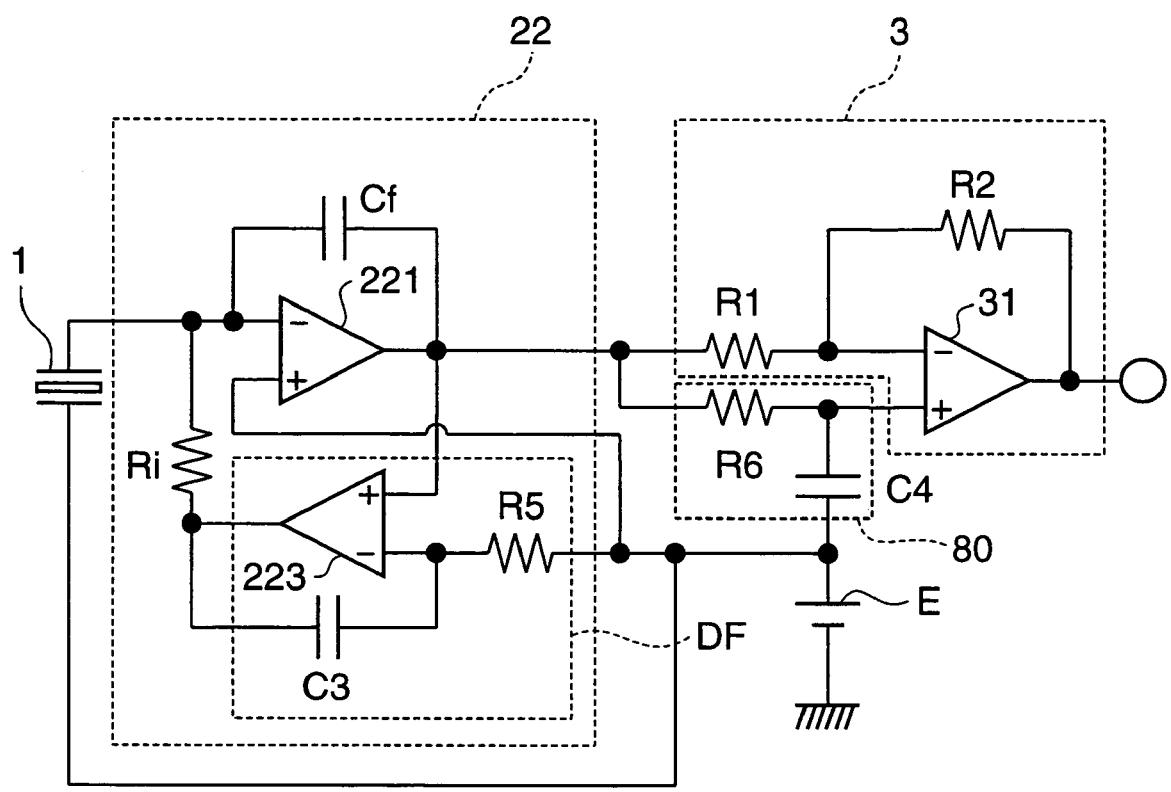
FIG. 11 is a circuit diagram of a main portion of a ninth modified infrared detecting circuit used in the infrared detector, showing a current-to-voltage converting circuit and a voltage amplifying circuit.

FIG. 11 is a circuit diagram of a part of a ninth modified infrared detecting circuit, showing a current-to-voltage converting circuit and a voltage amplifying circuit. The ninth modified infrared detecting circuit is identical to the fifth modification except for that a low-pass filter 80 is connected between the output terminal of an operational amplifier 221 and the non-inverting input terminal of an operational amplifier 31.

Upon the application of power, a minute leakage current occurs at the inverting input terminal of the operational amplifier 221. Since inverting input terminal of the operational amplifier 221 has a considerably high impedance, the leakage current causes the operating point of the voltage signal outputted from the current-to-voltage converting circuit 22 to largely deviate from the operation point in a normal state. The deviated operating point fluctuates and is consequently stabilized at the operating point in the normal state. This fluctuation of the operating point brings about the saturation of the voltage amplifying circuit 3. As described earlier, the signal components of around 0.1 to 1.0 Hz are important to detect a human body. The current-to-voltage converting circuit 22 is adapted to convert a current signal having this frequency band into a voltage signal by the use of a capacitor Cf. For this purpose, the resistors Ri and R5 is required to have a high resistance. However, it has been known that the integration of resistors having a high resistance makes the temperature characteristic of the resistors greater, which consequently causing a likelihood that the resistance value rises in the operation. The rise in the resistance value of the current-to-voltage converting circuit 2 shifts the peak frequency of the frequency characteristic toward the high frequency side. When the peak frequency is beyond 0.1 Hz, the signal components in the frequency band of 0.1 to 1.0 Hz is difficult to be converted into the voltage signal by the capacitor Cf. For this reason, in consideration of the resistance rise due to the temperature characteristic, the current-to-voltage converting circuit 2 is set to have a peak frequency considerably lower than 0.1 Hz, e.g., a few mHz. Consequently, a fairly large value is set as a time constant of the current-to-voltage converting circuit 22. This lengthens the fluctuating period of the operating point till stabilization, resulting in a problem that the voltage amplifying circuit 3 is saturated and does not respond for a certain period, e.g., for several minutes. This problem is solved by using the low-pass filter 80 in the ninth modification.

The low-pass filter 80 includes a resistor R6 and a capacitor C4. The resistor R6 is connected between the output terminal of the operational amplifier 221 and the non-inverting input terminal of the operational amplifier 31. The resistor R6 is constructed by an impurity-not-diffused polysilicon resistance element, that is, the resistance member is made of polysilicon in which no impurity is diffused. The capacitor C4 has one end connected with the non-inverting input terminal of the operational amplifier 31 and the other end grounded via a power supply E. The voltage signal outputted from the operational amplifier 221 is branched into two, one being directly inputted to the inverting input terminal of the operational amplifier 31 via the resistor R1 and the other being inputted to the non-inverting input terminal of the operational amplifier 31 via the low-pass filter 80.

The voltage signal passed through the low-pass filter 80 is inputted to the non-inverting input terminal of the operational amplifier 31 after having frequency components higher than a cutoff frequency removed. Thus, potential at the non-inverting input terminal is not changed by these high-frequency components.

Since a signal component of the voltage signal outputted from the operational amplifier 221 and containing frequency components lower than the cutoff frequency is inputted at the same phase to the inverting input terminal and the non-inverting input terminal of the operational amplifier 31, it is not amplified by the voltage amplifying circuit 3. On the other hand, a signal component of the voltage signal outputted from the operational amplifier 221 and containing frequency components higher than the cutoff frequency of the low-pass filter 80 is amplified by the voltage amplifying circuit 3 since being inputted only to the inverting input terminal. Accordingly, the voltage amplifying circuit 3 is not saturated because the signal component containing frequency components lower than the cutoff frequency, i.e., the signal component likely to cause the saturation of the voltage amplifying circuit 3, is not amplified by the voltage amplifying circuit 3.

The ninth modified infrared detecting circuit in which the low-pass filter 80 is connected with the non-inverting input terminal of the operational amplifier 31 can reliably prevent the saturation of the voltage amplifying circuit 3 resulting from the fluctuation of the operating point of the voltage signal outputted from the current-to-voltage converting circuit 22 during a specified period after the application of power.

Figure 12:
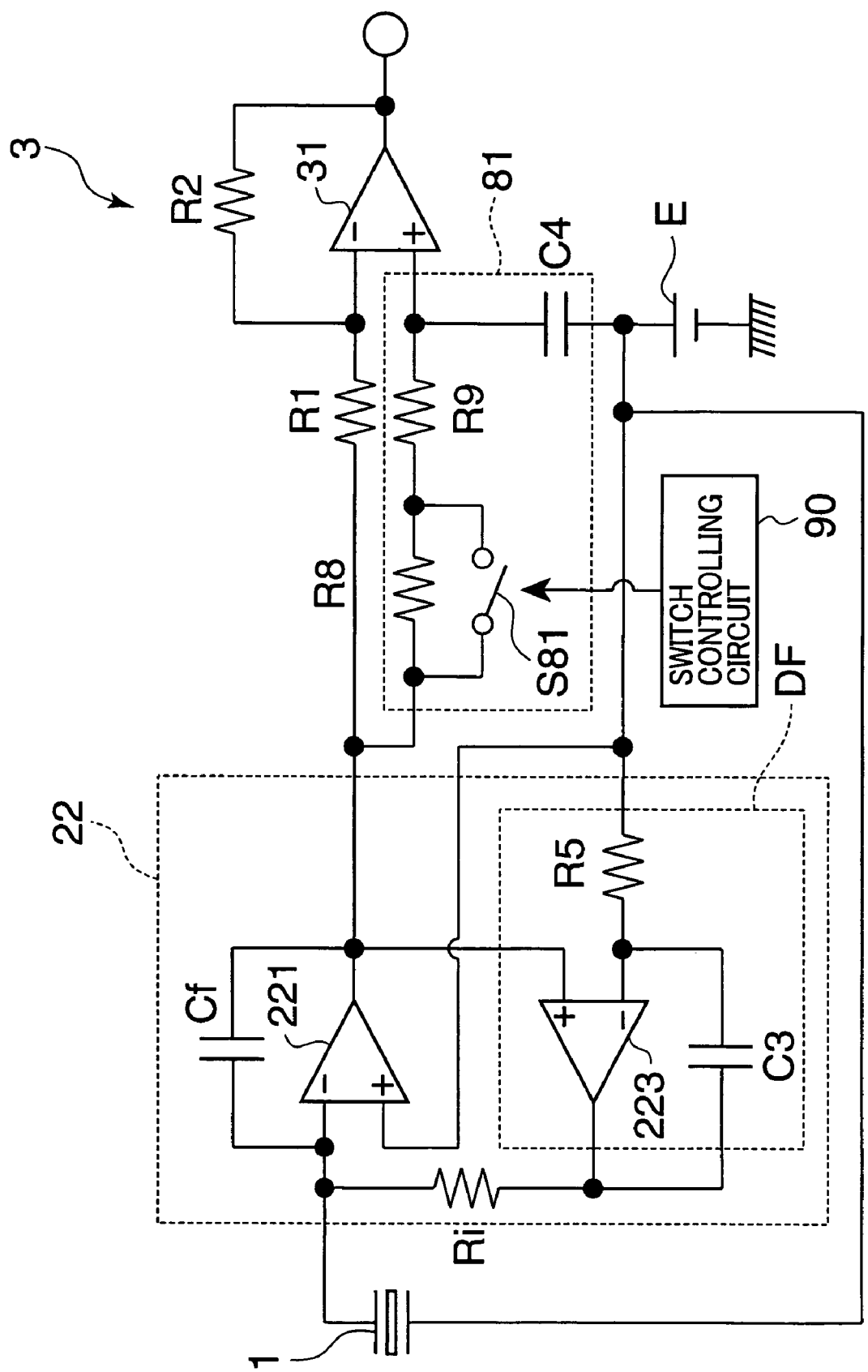
FIG. 12 is a circuit diagram of a main portion of a tenth modified infrared detecting circuit used in the infrared detector, showing a current-to-voltage converting circuit and a voltage amplifying circuit.

FIG. 12 is a circuit diagram showing an essential portion of a tenth modified infrared detecting circuit. This modification is identical to the ninth modification except for that a low-pass filter 81 is connected between a current-to-voltage converting circuit 22 and a voltage amplifying circuit 3. The low-pass filter 81 is provided with resistors R8, R9, a switch S81 and a switch controlling circuit 90. The resistors R8 and R9 are connected between the output terminal of an operational amplifier 221 and the non-inverting input terminal of an operational amplifier 31. The switch S81 is connected in parallel with the resistor R8. The respective resistors R8, R9 have resistance values set smaller than that of the resistor R6 shown in FIG. 11 and impurity-not-diffused polysilicon resistance elements are used as such.

The switch controlling circuit 90 controls the switch S81 to keep it on during a specified period after the application of power and to keep it off after the lapse of the specified period. The switch controlling circuit 90 includes a circuit for measuring time, for example, a counter, and starts counting by turning the switch S81 on after the application of power. When a count value of this counter reaches a predetermined value set beforehand, the switch S81 is turned off. For the integration of the circuit, a semiconductor switching element is preferably used as the switch S81.

Upon the application of power, the switch controlling circuit 90 turns the switch S81 on, thereby short-circuiting the resistor R8. Thus, the time constant of the low-pass filter 81 is determined by the capacitor C4 and the resistor R9. As a result, the time constant of the low-pass filter 81 is smaller when the switch S81 is on than when it is off, making the cutoff frequency higher.

The impurity-not-diffused polysilicon resistance elements used as the resistors R8, R9 for the integration of the circuit have a fairly large temperature characteristic, and the cutoff frequency of the low-pass filter 80 shown in FIG. 11 is set at a small value so as to cope with a variation of the resistance value caused by this temperature characteristic. Accordingly, there is a possibility that low frequency signal components having a low frequency band which brings about the saturation of the voltage amplifying circuit 3 are much cut during the specified period after the application of power, and is not introduced to the voltage amplifying circuit 3. For this reason, Accordingly, in the tenth modification, the saturation of the voltage signal is prevented by using the low-pass filter 81 which enables the time constant to decrease during the specified period after the application of power.

Figure 13:
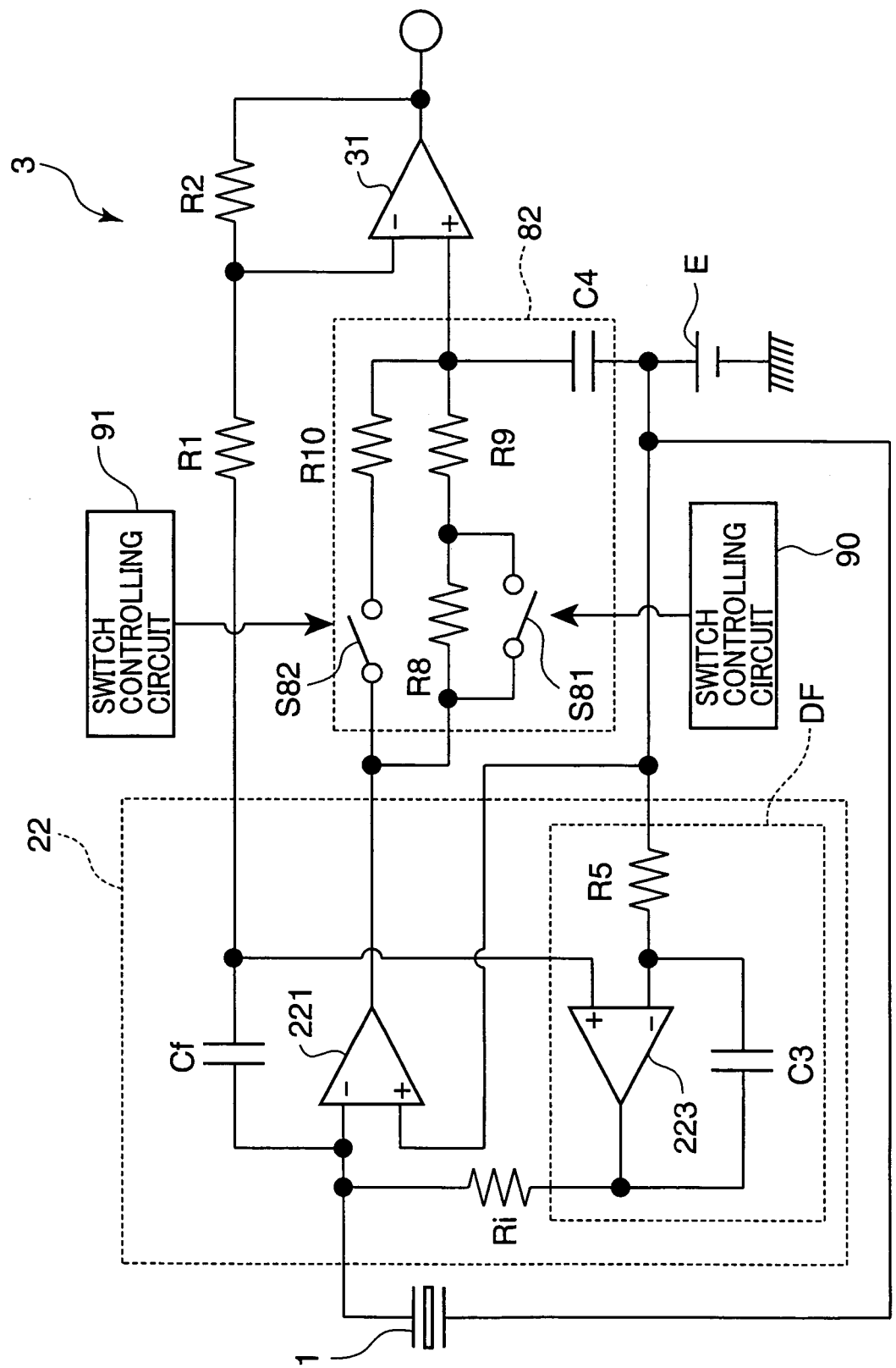
FIG. 13 is a circuit diagram of a main portion of an eleventh modified infrared detecting circuit used in the infrared detector, showing a current-to-voltage converting circuit and a voltage amplifying circuit.

FIG. 13 is a circuit diagram showing an essential portion of a eleventh modified infrared detecting circuit. This modification is identical to the tenth modification except for that a low-pass filter 82 is connected between a current-to-voltage converting circuit 22 and a voltage amplifying circuit 3. The low-pass filter 82 includes a switch S82 and a resistor R10 in addition to those of the low-pass filter 81 of the tenth modification. The switch S82 is connected with a switch controlling circuit 91 for controlling the switch S82.

The switch S82 and the resistor R10 are connected in series and are connected in parallel with the resistors R8, R9. Impurity-not-diffused polysilicon resistance elements are used as the resistors R8, R9, R10. A semiconductor switching element is used as the switch S82.

The switch controlling circuit 91 controls the switch S82 to turn it on when ambient temperature falls to a specified temperature or below, whereby power is applied to the resistor R10 and the time constant of the low-pass filter 82 is determined by a combined resistance value of the resistors R8, R9, R10 and the capacitance of the capacitor C4. The resistor R10 is connected in parallel with the resistors R8, R9 connected in series. Thus, the combined resistance value of the resistors R8, R9, R10 is smaller than a sum of the resistance values of the resistors R8 and R9. Therefore, the time constant of the low-pass filter 82 decreases when the switch S82 is turned on.

The impurity-not-diffused polysilicon resistance elements are used as the resistors R8, R9 for the integration of the detecting circuit. Since the above impurity-not-diffused polysilicon resistors have a property of increasing their resistance values as temperature decreases, the resistance values of the resistors R8, R9 increase when ambient temperature falls, with the result that the time constant of the low-pass filter 81 increases and the cutoff frequency thereof decreases. Therefore, there is a possibility that voltage signal components in a low-frequency band which brings about the saturation of the voltage amplifying circuit 3 are introduced to the voltage amplifying circuit 3 without being sufficiently cut.

Accordingly, in the eleventh modified infrared detecting circuit, the saturation of the voltage amplifying circuit 3 caused by low temperature is prevented by using the low-pass filter 82 which enables the time constant to decrease when temperature is low.

Figure 14:
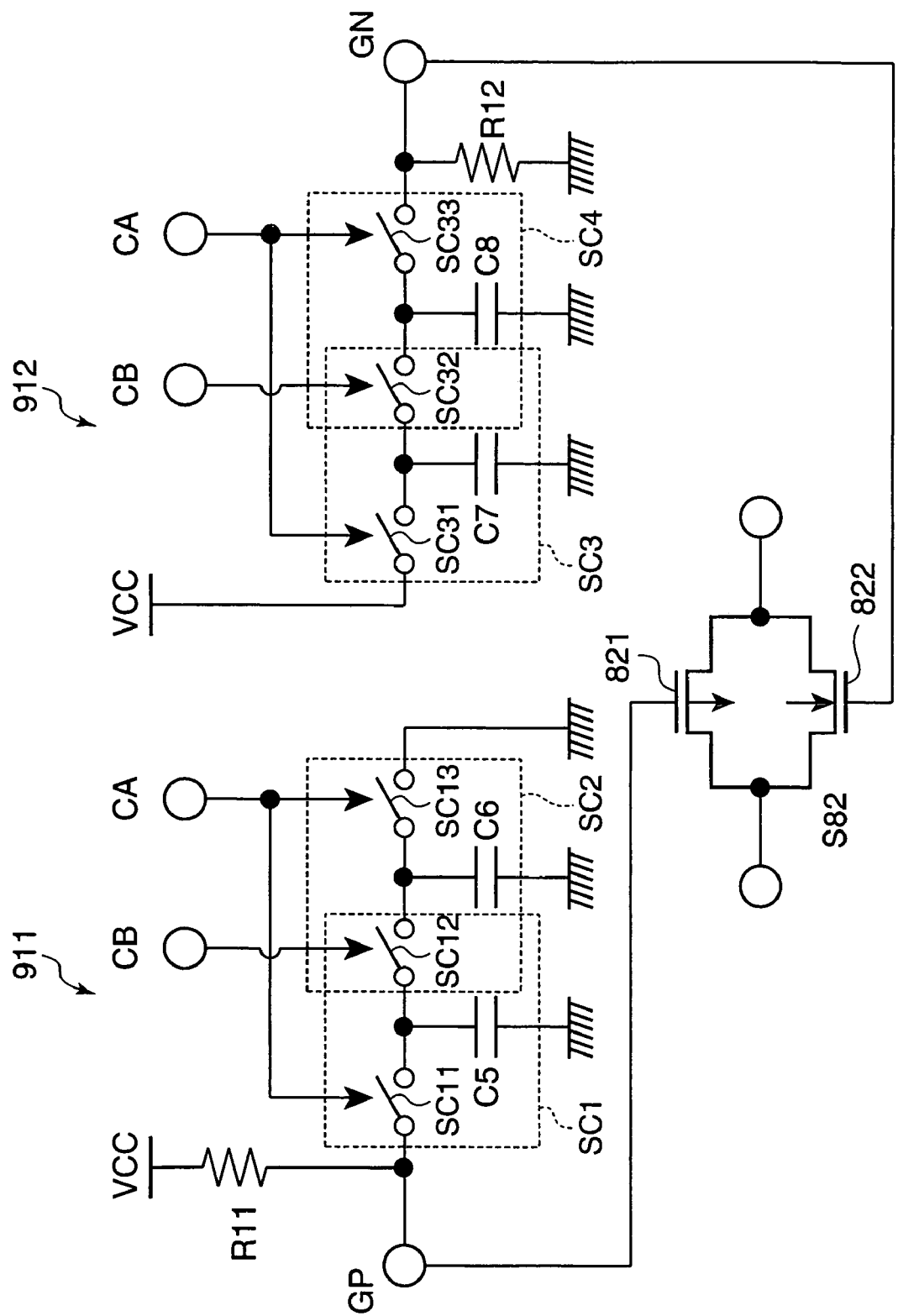
FIG. 14 is a circuit diagram of a switch controlling portion of the infrared detecting circuit shown in FIG. 13.
Figure 15:
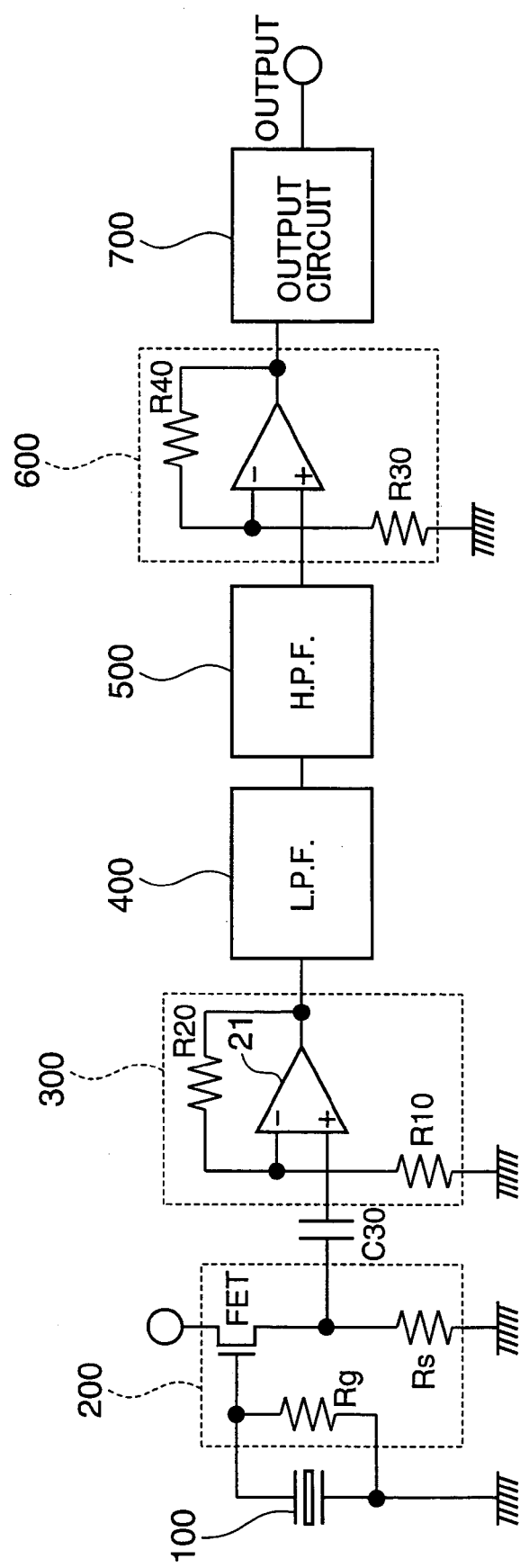
FIG. 15 is a circuit diagram showing a prior art infrared detecting circuit.

FIG. 14 is a circuit diagram of the switch S82 and the switch controlling circuit 91. The switch S82 includes a switch 821 constructed by a n(negative)-type MOSFET (metal oxide semiconductor field effect transistor) and a switch 822 constructed by a p(positive)-type MOSFET. The switch controlling circuit 91 includes a controlling circuit 911 for controlling the switch 821 and a controlling circuit 912 for controlling the switch 822.

The controlling circuit 911 is comprised of a resistor R11, switched capacitors SC1 and SC2. The resistor R11 is an impurity-not-diffused polysilicon resistance element and has one end thereof connected with a voltage supply VCC and the other end thereof connected with a voltage-dividing terminal GP. The switched capacitors SC1, SC2 are successively connected with the voltage-dividing terminal GP. The switched capacitor SC1 includes switching elements SC11, SC12 and a capacitor C5, whereas the switched capacitor SC2 includes switching elements SC12, SC13 and a capacitor C6.

One end of the capacitor C5 is grounded while the other end thereof is connected between the switching elements SC11 and SC12. Further, one end of the capacitor C6 is grounded while the other end thereof is connected between the switching elements SC12 and SC13.

A clock signal is inputted to the switching elements SC11, SC13 via a terminal CA. A clock signal having a phase opposite from that of the clock signal inputted to the terminal CA is inputted to the switching element SC12 via a terminal CB. In this way, the switching elements SC11, SC12 are alternately turned on and off and the switching elements SC12 and SC13 are alternately turned on and off. Thus, the switched capacitors SC1, SC2 display their function. An equivalent resistance by the switched capacitor is expressed by $R=1/f \cdot C$ if f denotes a frequency of the clock signal inputted to the switching element. Since $C5=C6=0.5$ pF and the frequency f of the clock signal to be inputted to the terminals CA, CB is set at 100 Hz (f=100 Hz) in this modification, the equivalent resistance of the switched capacitors SC1, SC2 are 20 GΩ, respectively. The voltage-dividing terminal GP is connected with a gate of the switch 821.

The controlling circuit 912 is comprised of switched capacitors SC3 and SC4 and a resistor R12. One end of the switched capacitor SC3 is connected with a voltage supply VCC, whereas the other end thereof is connected with the switched capacitor SC4. The resistor R12 is an impurity-not-diffused polysilicon resistance element and has one end thereof connected between the switched capacitor SC4 and a voltage-dividing terminal GN and the other end thereof grounded. The switched capacitor SC3 includes switching elements SC31, SC32 and a capacitor C7, whereas the switched capacitor SC4 includes switching elements SC32, SC33 and a capacitor C8. A clock signal is inputted to the switching elements SC31, SC33 via a terminal CA. A clock signal having a phase opposite from that of the clock signal inputted to the terminal CA is inputted to the switching element SC32 via a terminal CB.

Similar to the switched capacitors SC1, SC2, the equivalent resistances of the switched capacitors SC3, SC4 are set at 20 GΩ, respectively. Since the equivalent resistance by the switched capacitor SC1 and the one by the switched capacitor SC2 are connected in series in the controlling circuit 911, the equivalent resistances of the switched capacitors SC1, SC2 are 40 GΩ. Likewise, the equivalent resistances of the switched capacitors SC3, SC4 are 40 GΩ. Thus, if R11=R12=40 GΩ, potentials at the voltage-dividing terminals GP, GN are ½VCC at normal ambient temperature. Since the resistance values of the resistors R11, R12 increase as temperature falls, potential at the voltage-dividing terminal GP falls, with the result that potential at the voltage-dividing terminal GP decreases and potential at the voltage-dividing terminal GN increases. Therefore, the switches 821, 822 are both turned on to apply power to the resistor R10.

As described above, according to the infrared detecting circuit of the eleventh modification, the switch S82 and the resistor R10 are connected in parallel with the resistors R8, R9 and the switch controlling circuit 91 is provided to turn the switch S82 on when temperature is low. Thus, the saturation of the voltage amplifying circuit 3 can be prevented when temperature is low since a voltage signal component which is in the low frequency band and brings about the saturation of the voltage amplifying circuit 3 is not amplified. The resistance circuit element Z is used as a circuit for feeding back the direct current component in the current-to-voltage converting circuit. It may be appreciated to use an integrating circuit as the direct current feedback circuit in place of the resistance circuit element Z. In this case, the signal components other than the direct current component are fed back while being greatly attenuated, which consequently effecting more stabilization of the operating point of the outputted voltage signal.

As described above, a novel infrared detecting circuit, comprises: a current-to-voltage converting circuit which is to be connected with a pyroelectric element operable to generate a current signal in accordance with a received infrared ray, and the current-to-voltage converting circuit converting the current signal outputted from the pyroelectric element into a voltage signal, the current-to-voltage converting circuit including an operational amplifier connected with the pyroelectric element, a capacitor, and a feedback circuit for feeding back a direct current component, the capacitor and the feedback circuit being connected between an output terminal and an inverting input terminal of the operational amplifier in parallel with each other; an amplifying circuit which amplifies the voltage signal outputted from the current-to-voltage converting circuit; a band-pass filter circuit including a switched capacitor and adapted to pass components of a voltage signal from the amplifying circuit in a specified frequency band; a clock generating circuit which generates a reference clock signal for controlling the switched capacitor; and an output circuit which outputs a voltage signal outputted from the band-pass filter circuit as a detection signal when the voltage signal is at a threshold level or higher.

In the thus constructed infrared detecting circuit, a detection current signal outputted from the pyroelectric element is outputted from the output terminal of the operation amplifier after being converted into a voltage signal by the capacitor. The direct current components of the outputted voltage signal are fed back to the inverting input terminal by the way of the feedback circuit. Accordingly, the variation of the direct current components of the outputted voltage signal is suppressed, with the result that an operating point is stabilized. This eliminates the need for a coupling capacitor for cutting the variation of the operating point, thereby enabling the detecting circuit to be miniaturized.

It may be preferable to provide an amplifying circuit between the band-pass filter circuit and the output circuit. With this construction, the voltage signal outputted from the band-pass filter circuit is introduced to the output circuit after being amplified to a specified amplitude level by the second amplifying circuit, thereby setting the threshold level of the output circuit at a suitable value to increase the detection accuracy.

It may be preferable to provide a high-pass filter having a specified gain between the band-pass filter circuit and the output circuit. With this construction, the voltage signal outputted from the band-pass filter circuit has its low-frequency components cut by the high-pass filter. Thus, the variation of the operating point of the band-pass filter circuit is cut. Further, the high-pass filter has the specified gain. The voltage signal in the desired frequency band that has the specified gain is introduced to the subsequent output circuit. Accordingly, the detection accuracy can be remarkably increased.

The band-pass filter circuit may be preferably provided with a high-pass filter at a first stage, a low-pass filter at a second stage, and a high-pass filter at a third stage. In other words, the band-pass filter circuit may be constructed by alternately connecting low-pass filters and high-pass filters one stage after another. With this construction, the voltage signal outputted from the amplifying circuit has the variation of the operating point thereof cut by the high-pass filter at the first stage and has the high-frequency components thereof cut by the low-pass filter connected at the second or later stage. Then, the variation of the operating point caused by feedthrough noise during the switching of the switched capacitor is cut by the high-pass filter connected at the third or later stage. Accordingly, this construction can output a voltage signal having the variation of the operating point and the return noises cut.

Further, it may be preferable that the low-pass filter has a specified gain. With this construction, the band-pass filter circuit can have a larger gain while suppressing the significant variation of the operating point of the low-pass filter.

This eliminates the need of providing an amplifying circuit at the subsequent stage of the band-pass filter circuit to correspond to the detection level of the output circuit, consequently enabling the miniaturization of the detecting circuit.

It may be preferable to provide a high-pass filter having a specified gain between the band-pass filter circuit and the output circuit, and the band-pass filter circuit including a high-pass filter at a first stage, a low-pass filter at a second stage, and a high-pass filter at a third stage. With this construction, the band-pass filter circuit includes the high-pass filters and the low-pass filters alternately connected with one another, the voltage signal having the variation of the operating point due to the feedthrough noises and the return noises cut is sent to the high-pass filter at the following stage. The high-pass filter has the specified gain. Accordingly, the voltage signal in the desired frequency band having the gain is sent to the subsequent output circuit. Thus, the detection accuracy can be remarkably increased.

The band-pass filter circuit may be preferably provided with a low-pass filter at a first stage, and a high-pass filter at a second stage. With this construction, the high-frequency components contained in the voltage signal outputted from the amplifying circuit are cut in a concentrated manner by the low-pass filter connected at the first stage, an occurrence of return noise can be suppressed.

The current-to-voltage converting circuit may be preferably provided with a switched capacitor. With this construction, a high-resistance member can be equivalently constructed by switching a small capacitor as the current-to-voltage converting circuit by a clock signal. Thus, the current-to-voltage converting circuit having a small size and a good temperature characteristic can be obtained.

Preferably, the infrared detecting circuit may be further provided with a clock control circuit connected between the switched capacitor and the clocking generating circuit and being connectable with an external clock generator for generating an external clock signal having a higher frequency than the reference clock signal of the clock generating circuit. The clock control circuit changes over the reference clock signal and the external clock signal.

With this construction, a clock signal having a frequency different from the one during a normal operation can be fed to the switched capacitor filter of the band-pass filter circuit. For example, the frequency characteristic of the circuit shifts toward a higher frequency side by feeding a clock signal having a frequency higher than the clock signal fed during the normal operation. Since frequency characteristic can be quickly tested by feeding the high-frequency clock signal to the switched capacitor filter, a testing time can be shortened.

Preferably, the infrared detecting circuit is integrated into a single semiconductor chip. Then, the infrared detecting circuit can be miniaturized.

The feedback circuit may be preferably provided with a resistance member. With this construction, the operating point of the voltage signal outputted from the operation amplifier can be stabilized by a simple construction.

Preferably, the feedback circuit may be provided with an integrating circuit. With this construction, the signal components other than the direct-current component are fed back while being greatly attenuated. The operating point of the outputted voltage signal can be more stabilized.

It may be preferable that the amplifying circuit includes an operational amplifier, an output terminal of the operational amplifier of the current-to-voltage converting circuit is connected with an inverting input terminal of the operational amplifier of the amplifying circuit via a resistance for amplification, and a low-pass filter is connected between the output terminal of the operational amplifier of the current-to-voltage converting circuit and a non-inverting input terminal of the operational amplifier of the amplifying circuit.

With this construction, the voltage signal outputted from the output terminal of the operational amplifier of the current-to-voltage converting circuit is branched into two, one being inputted to the inverting input terminal of the operational amplifier of the amplifying circuit via the resistance for amplification and the other being inputted to the non-inverting input terminal of the operational amplifier of the amplifying circuit after having the high-frequency components removed upon passing the low-pass filter. Accordingly, a signal component of the voltage signal outputted from the current-to-voltage converting circuit containing frequency components lower than a cutoff frequency of the low-pass filter is inputted at the same phase to the inverting input terminal and the non-inverting input terminal of the operational amplifier of the amplifying circuit. Thus, an output from the amplifying circuit is not amplified.

On the other hand, since a signal component containing frequency components higher than the cutoff frequency of the low-pass filter is not inputted to the non-inverting input terminal of the operational amplifier of the amplifying circuit, potential at the non-inverting input terminal does not vary, with the result that this signal component is outputted after being amplified by the amplifying circuit. The voltage signal components in the low frequency band which are likely to cause the amplifying circuit to saturate is not amplified by the amplifying circuit. This prevents the amplifying circuit from being saturated by fluctuation of the operating point of the voltage signal outputted from the current-to-voltage converting circuit due to the influence of a leakage current at the inverting input terminal of the operational amplifier of the current-to-voltage converting circuit during a specified period after the application of power.

Further, the band-pass filter circuit may be preferably provided with a high-pass filter at a first stage, a low-pass filter at a second stage, and a high-pass filter at a third stage, in addition to that the amplifying circuit includes an operational amplifier, an output terminal of the operational amplifier of the current-to-voltage converting circuit is connected with an inverting input terminal of the operational amplifier of the amplifying circuit via a resistance for amplification, and a low-pass filter is connected between the output terminal of the operational amplifier of the current-to-voltage converting circuit and a non-inverting input terminal of the operational amplifier of the amplifying circuit.

With this construction, the high-pass filter at the first stage cut the variation of the operating point of the voltage signal outputted from the amplifying circuit. The low-pass filters at the second stage cut the high frequency components. The high-pass filter at the third stage cuts the variation of the operating point caused by the feedthrough noises occurring when the switched capacitor is operated. Thus, the voltage signal having a smaller variation of the operating point and without return noises can be sent to the output circuit.

The voltage signal outputted from the output terminal of the operational amplifier of the amplifying circuit is branched to the inverting input terminal of the operational amplifier of the amplifying circuit via the resistance for amplification, and to the non-inverting input terminal of the operational amplifier of the amplifying circuit via the low-pass filter while the high frequency component is cut. Accordingly, the voltage signal component in the frequency band lower than the cutoff frequency of the low-pass filter is input to the inverting and non-inverting input terminals of the operational amplifier of the amplifying circuit, and is not consequently amplified by the amplifying circuit.

On the other hand, the voltage signal in the frequency band higher than the cutoff frequency of the low-pass filter is not inputted to the non-inverting input terminal of the operational amplifier of the amplifying circuit, consequently not changing the potential at the non-inverting input terminal of the operational amplifier of the amplifying circuit. Accordingly, this signal component is outputted after being amplified by the amplifying circuit. The voltage signal components in the low frequency band which are likely to cause the amplifying circuit to saturate is not amplified by the amplifying circuit. This prevents the amplifying circuit from being saturated by fluctuation of the operating point of the voltage signal outputted from the current-to-voltage converting circuit due to the influence of a leakage current at the inverting input terminal of the operational amplifier of the current-to-voltage converting circuit during a specified period after the application of power.

The low-pass filter may be preferably provided with a resistance member connected between the output terminal of the operational amplifier of the current-to-voltage converting circuit and the non-inverting input terminal of the operational amplifier of the amplifying circuit, and a capacitor connected between the non-inverting input terminal of the operational amplifier of the amplifying circuit and the ground. With this construction, the low-pass filter can be made in a simpler construction.

Further, it may be preferable to provide a switch connected with the resistance member in parallel with each other, and a switch controller for controlling the switching circuit.

With this construction, the switch is turned on in accordance with a command from the switch controller to short-circuit the resistance member connected in parallel with the switch immediately after the application of power. Thus, the time constant of the low-pass filter decreases and the cutoff frequency thereof increases immediately after the application of power. As a result, the voltage signal outputted from the current-to-voltage converting circuit is introduced to the amplifying circuit after its signal component in the low frequency band which is likely to cause the amplifying circuit to saturate is securely cut. Therefore, the saturation of the amplifying circuit due to the fluctuation of the operating point during the specified period after the application of power can be more securely prevented.

The resistance member may be preferable made of an impurity-not-diffused polysilicon. With this construction, the low-pass filter can be integrated since the resistance member is made of impurity-not-diffused polysilicon. Thus, no external part needs to be mounted on the infrared detecting circuit.

Further, it may be preferable that the low-pass filter is further provided with a secondary resistance circuit connected in parallel with the resistance member, and a secondary switch controller for turning the secondary switch on when the ambient temperature is lower than a predetermined value. The secondary resistance circuit has a secondary resistance member made of an impurity-not-diffused polysilicon, and a secondary switch connected in series with the secondary resistance member.

With this construction, the resistance value of the secondary resistance member increases when temperature is low since the secondary resistance member is constructed by the impurity-not-diffused polysilicon resistance elements. When the resistance value reaches a predetermined value or higher, the secondary switch is turned on by the secondary switch controller to apply power to the secondary resistance member. In other words, since the two resistance members are connected in parallel in the low-pass filter and the time constant of the low-pass filter decreases when temperature is low, the cutoff frequency of the low-pass filter increases. Thus, when temperature is low, the voltage signal is introduced to the amplifying circuit after its signal component in the low frequency which causes the amplifying circuit to saturate is securely cut. Therefore, the saturation of the amplifying circuit when temperature is low can be prevented.

Preferably, the secondary switch controller may be provided with a switched capacitor for producing an equivalent resistance, thereby controlling the switching circuit using a voltage divided by an equivalent resistance produced by the switched capacitor and resistances of the resistance member.

With this construction, when ambient temperature is low, the resistances of the impurity-not-diffused polysilicon resistance members increase and the voltage divided by the resistances acts to turn the secondary switch on, thereby turning the secondary switch on. In other words, since changes in the resistance values of the impurity diffuse polysilicon resistance members are detected using the impurity diffuse polysilicon resistance member, changes in the resistance values caused by the temperature characteristic of the impurity diffuse polysilicon resistance members can be precisely detected. In addition, since the two resistance members are made of impurity diffuse polysilicon, the detecting circuit can be integrated.

Preferably, the infrared detecting circuit may be further provided with a reference voltage circuit for generating a reference voltage, the reference voltage circuit being connected with the pyroelectric element and the non-inverting input terminals of the respective operational amplifiers of the current-to-voltage converting circuit and the amplifying circuit.

With this construction, the reference voltage to be fed to the pyroelectric element and the one to be fed to the non-inverting input terminals of the two operational amplifiers are given by the single reference voltage circuit. This sets off amplification of noises which are likely to influence the output of the amplifying circuit, and reduces the occurrence of noises of the infrared detecting circuit.

A novel infrared detector comprises the above-mentioned infrared detecting circuit, and a pyroelectric element for receiving an infrared ray and produces a current signal in accordance with the received infrared ray. With this construction, an infrared detector can be miniaturized since having the miniaturized infrared detecting circuit.

As this invention may be embodied in several forms without departing from the spirit of essential characteristics thereof, the present examples are therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

INDUSTRIAL APPLICABILITY

A novel infrared detecting circuit and infrared detector can be miniaturized by directly connecting a current-to-voltage converting circuit and a voltage amplifying circuit. The variation of the operating point can be considerably cut to increase the detection accuracy remarkably. A novel infrared detecting circuit and novel infrared detector which are smaller in the size and have a higher detection accuracy are widely usable in the infrared detection field.

The invention claimed is:

1. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor; and
an output circuit that outputs a voltage signal output from the band-pass filter circuit as a detection signal when the voltage signal is at a threshold level or higher, wherein a high-pass filter having a specified gain is connected between the band-pass filter circuit and the output circuit.

2. An infrared detecting circuit according to claim 1, wherein an additional amplifying circuit is connected between the band-pass filter circuit and the output circuit.

3. An infrared detecting circuit according to claim 1, wherein the band-pass filter circuit includes a high-pass filter at a first stage, a low-pass filter at a second stage, and a high-pass filter at a third stage.

4. An infrared detecting circuit according to claim 1, wherein the band-pass filter circuit includes a low-pass filter at a first stage, and a high-pass filter at a second stage.

5. An infrared detecting circuit according to claim 1, wherein the current-to-voltage converting circuit, the amplifying circuit, the band-pass filter circuit, and the output circuit are integrated into a single chip.

6. An infrared detecting circuit according to claim 1, wherein the feedback circuit includes a resistance member.

7. An infrared detecting circuit according to claim 1, wherein the feedback circuit includes an integrating circuit.

8. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor; and
an output circuit that outputs a voltage signal output from the band-pass filter circuit as a detection signal when the voltage signal is at a threshold level or higher, wherein the band-pass filter circuit includes a high-pass filter at a first stage, a low-pass filter at a second stage, and a high-pass filter at a third stage.

9. An infrared detecting circuit according to claim 8, wherein the low-pass filter has a specified gain.

10. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor; and
an output circuit that outputs a voltage signal output from the band-pass filter circuit as a detection signal when the voltage signal is at a threshold level or higher, wherein the current-to-voltage converting circuit includes a switched capacitor.

11. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor;
an output circuit that outputs a voltage signal output from the band-pass filter circuit as a detection signal when the voltage signal is at a threshold level or higher; and
a clock control circuit which is connected between the switched capacitor and the clock generating circuit, and is connectable with an external clock generator for generating an external clock signal having a higher frequency than the reference clock signal of the clock generating circuit, whereby the clock control circuit changes over the reference clock signal and the external clock signal.

12. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor; and
an output circuit that outputs a voltage signal output from the band-pass filter circuit as a detection signal when the voltage signal is at a threshold level or higher,
wherein the amplifying circuit includes an operational amplifier, an output terminal of the operational amplifier of the current-to-voltage converting circuit is connected with an inverting input terminal of the operational amplifier of the amplifying circuit via a resistance for amplification, and a low-pass filter is connected between the output terminal of the operational amplifier of the current-to-voltage converting circuit and a non-inverting input terminal of the operational amplifier of the amplifying circuit.

13. An infrared detecting circuit according to claim 12, wherein the band-pass filter circuit includes a high-pass filter at a first stage, a low-pass filter at a second stage, and a high-pass filter at a third stage.

14. An infrared detecting circuit according to claim 12, wherein the low-pass filter includes:
a resistance member connected between the output terminal of the operational amplifier of the current-to-voltage converting circuit and the non-inverting input terminal of the operational amplifier of the amplifying circuit; and
a capacitor connected between the non-inverting input terminal of the operational amplifier of the amplifying circuit and the ground.

15. An infrared detecting circuit according to claim 14, further comprising:
a switch connected with the resistance member in parallel with each other; and
a switch controller which controls the switch.

16. An infrared detecting circuit according to claim 15, wherein the resistance member comprises an impurity-not-diffused polysilicon.

17. An infrared detecting circuit according to claim 16, wherein the low-pass filter further includes:
a secondary resistance circuit connected in parallel with the resistance member, and comprising:
a secondary resistance member comprising an impurity-not-diffused polysilicon;
and a secondary switch connected in series with the secondary resistance member;
a secondary switch controller which turns the secondary switch on when the ambient temperature is lower than a predetermined value.

18. An infrared detecting circuit according to claim 17, wherein the secondary switch controller includes a switched capacitor which produces an equivalent resistance, thereby controlling the switch using a voltage divided by an equivalent resistance produced by the switched capacitor and resistances of the resistance member.

19. An infrared detecting circuit, comprising:
a current-to-voltage converting circuit that is connectable to a pyroelectric element operable to generate a current signal in accordance with a received infrared ray, wherein the current-to-voltage converting circuit converts the current signal output from the pyroelectric element into a voltage signal, the current-to-voltage converting circuit includes an operational amplifier, a capacitor, and a feedback circuit for feeding back a direct current component, the capacitor and the feedback circuit being connected between an output terminal and an inverting input terminal of the operational amplifier in parallel with each other;
an amplifying circuit that amplifies the voltage signal output from the current-to-voltage converting circuit;
a band-pass filter circuit that is configured to pass components of a voltage signal from the amplifying circuit in a specified frequency band, wherein the band-pass filter circuit includes a switched capacitor;
a clock generating circuit which generates a reference clock signal for controlling the switched capacitor;
an output circuit that outputs a voltage signal output from the band-pass filter circuit as a detection signal when the voltage signal is at a threshold level or higher; and
a reference voltage circuit which generates a reference voltage, the reference voltage circuit being connected with the pyroelectric element and the non-inverting input terminals of the respective operational amplifiers of the current-to-voltage converting circuit and the amplifying circuit.

* * * * *